(12) United States Patent
Kinoshita et al.

(10) Patent No.: US 8,964,038 B2
(45) Date of Patent: Feb. 24, 2015

(54) IMAGE PROCESSING APPARATUS, METHOD, AND COMPUTER PROGRAM STORAGE DEVICE

(75) Inventors: Masaya Kinoshita, Kanagawa (JP); Yutaka Yoneda, Kanagawa (JP); Takashi Kameya, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 13/636,203

(22) PCT Filed: Mar. 16, 2011

(86) PCT No.: PCT/JP2011/001547
§ 371 (c)(1),
(2), (4) Date: Oct. 15, 2012

(87) PCT Pub. No.: WO2011/121917
PCT Pub. Date: Oct. 6, 2011

(65) Prior Publication Data
US 2013/0027579 A1    Jan. 31, 2013

(30) Foreign Application Priority Data
Mar. 30, 2010   (JP) .................................. 2010-079189

(51) Int. Cl.
*H04N 5/225* (2006.01)
*H04N 5/232* (2006.01)
(Continued)

(52) U.S. Cl.
CPC ............... *H04N 5/232* (2013.01); *G03B 15/00* (2013.01); *G06K 9/00771* (2013.01); *H04N 5/23222* (2013.01)
USPC ........................................................ 348/169

(58) Field of Classification Search
CPC ... H04N 7/181; H04N 5/232; H04N 5/23222; G01S 3/7864; G01S 3/7865; G08B 13/19602
USPC .............. 348/143, 152, 154, 161, 169, 172, 348/208.14; 382/118
See application file for complete search history.

(56) References Cited

U.S. PATENT DOCUMENTS

2007/0195174 A1\* 8/2007 Oren ........................... 348/222.1
2008/0159628 A1\* 7/2008 Yoshida ....................... 382/190
(Continued)

FOREIGN PATENT DOCUMENTS

JP       06-243259 A    9/1994
JP       2000 196934    7/2000
(Continued)

OTHER PUBLICATIONS

International Search Report Issued Apr. 12, 2011 in PCT/JP11/01547 Filed Mar. 16, 2011.

(Continued)

*Primary Examiner* — Aung S Moe
*Assistant Examiner* — Chriss Yoder, III
(74) *Attorney, Agent, or Firm* — Oblon, Spivak, McClelland, Maier & Neustadt, L.L.P.

(57) ABSTRACT

An image processing apparatus, method and non-transitory computer program storage device cooperate to process successive images. Respective frames are created and positioned within the successive images, where each frame has a border. When changes between the frame borders are detected, a controller triggers the capturing of an image. This approach results in the capturing of interesting moments, even if the subject is not a human subject. The change in frame boundaries may be categorized in a variety of ways, including change in aspect ratio, shape, orientation, and position, for example. By detecting the changes in this way, an imaging device can capture images of interesting events automatically.

18 Claims, 27 Drawing Sheets

(51) Int. Cl.
  *G03B 15/00* (2006.01)
  *G06K 9/00* (2006.01)

(56) References Cited

U.S. PATENT DOCUMENTS

| | | |
|---|---|---|
| 2009/0009651 A1 | 1/2009 | Takayanagi |
| 2009/0213231 A1 | 8/2009 | Kurokawa |
| 2009/0231453 A1 | 9/2009 | Huang |
| 2010/0007763 A1 | 1/2010 | Yokohata |
| 2010/0157129 A1* | 6/2010 | Lee .................... 348/333.04 |

FOREIGN PATENT DOCUMENTS

| JP | 2000-196934 A | 7/2000 |
|---|---|---|
| JP | 2005-535022 A | 11/2005 |
| JP | 2006-237961 A | 9/2006 |
| JP | 2007 123953 | 5/2007 |
| JP | 2007-123953 A | 5/2007 |
| JP | 4197019 B2 | 12/2008 |
| JP | 2009 124210 | 6/2009 |
| JP | 2009-124210 A | 6/2009 |
| JP | 2009 200713 | 9/2009 |
| JP | 2009-200713 A | 9/2009 |
| JP | 2009 253542 | 10/2009 |
| JP | 2009-253542 A | 10/2009 |

OTHER PUBLICATIONS

Office Action issued Sep. 3, 2013 in Japanese Patent Application No. 2010-079189.
The Extended European Search Report issued May 21, 2014, in Application No. / Patent No. 11762170.6-1902 / 2553920.
Chinese Office Action issued Oct. 22, 2014, in Chinese Patent Application No. 201180015023.4 with English Translation.

* cited by examiner

IMAGE PROCESSING APPARATUS, METHOD, AND COMPUTER PROGRAM STORAGE DEVICE

TECHNICAL FIELD

The present invention relates to an image processing apparatus, method, and a computer program storage device. The present invention specifically relates to an image processing apparatus, method, and computer program storage device that are capable of obtaining a best shot image.

BACKGROUND ART

Recently, in imaging apparatuses such as a digital still camera, a technology has been proposed in which a facial expression detection function is provided that detects a face of a subject person and detects the expression of the face. When the facial expression detection function detects that the facial expression of the subject is a smile, a captured image is automatically recorded (refer to Patent Literature 1).

CITATION LIST

Patent Literature

PTL 1: Japanese Patent No. 4197019

SUMMARY OF INVENTION

Technical Problem

However, as recognized by the present inventors, with the technology described in Patent Literature 1, the triggering of the shutter is based only the expression of the face, and a change in the state of the subject other than the face, such as the moment when a running person falls down, the moment when a child stops moving around, or the like, cannot be automatically recorded as a captured image. Further, the technology described in Patent Literature 1 cannot be applied to a subject having no facial expression, other than a person.

The present invention has been made in light of the foregoing circumstances, and particularly, the present invention aims to obtain a best shot image more reliably.

For example, an exemplary image processing apparatus according to one embodiment of the present invention includes
a processor configured to create a first frame border positioned within a first image and a second frame border positioned within a second image, the first image and the second image being sequential images in time; and
a controller configured to detect a change between the first frame border and the second frame border.

The image processing apparatus optional includes a shutter, and a shutter triggering mechanism configured to actuate the shutter and capture an image with an image sensor in response to the controller detecting a change between the first frame border and the second frame border. The change between the first frame border and the second frame border may be at least one of
a change in aspect ratio,
a change in shape, and
a change in position. Also, change between the first frame border and the second frame border may occur in response to one of a movement of a subject within the first frame border and second frame, and a feature change of the subject.

The shutter triggering mechanism may be configured to actuate the shutter after a predetermined period of time in which the shutter is inactive.

This exemplary image processing apparatus may process the first image and the second image within a video, wherein the video including images captured in a viewfinder of at least one of a digital still camera and a digital video recorder; and the first frame border and the second frame border being visible within the viewfinder.

Additionally, the processor is configured to determine a first smaller frame positioned within the first frame border, and a second smaller frame within the second frame border, and
the change between the first frame border and second frame border is detected by the controller when a ratio of areas of the first smaller frame to first frame border and a ratio of areas of the second smaller frame to second frame border satisfies a predetermined criteria.

Another exemplary embodiment of the present invention is a method that includes
determining with a processor a first frame border positioned within a first image and a second frame border positioned within second image, the first image and the second image being sequential images in time; and
detecting a change between the first frame border and the second frame border.

This method optional actuates a shutter and captures an image with an image sensor in response to the detecting a change between the first frame border and the second frame border. The change between the first frame border and the second frame border being at least one of
a change in aspect ratio,
a change in shape, and
a change in position. Also, the change between the first frame border and the second frame border occurs in response to one of a movement of a subject within the first frame border and second frame, and a feature change of the subject.

The shutter may be actuated after a predetermined period of time in which the shutter is inactive.

The method may also include capturing the images in a viewfinder of at least one of a digital still camera and a digital video recorder; and
presenting the first frame border and the second frame border within the viewfinder.

Optionally, the method may determine a first smaller frame positioned within the first frame border, and a second smaller frame within the second frame border, wherein a change between the first frame border and second frame border is detected when a ratio of areas of the first smaller frame to first frame border and a ratio of areas of the second smaller frame to second frame border satisfies a predetermined criteria.

Another exemplary embodiment of the present invention is a non-transitory computer readable storage device having instructions that when executed by a processor perform a method including
determining with a processor a first frame border positioned within the first image and a second frame border positioned within the second image, the first image and the second image being sequential images in time; and
detecting a change between the first frame border and the second frame border.

The non-transitory computer program storage device may also actuate a shutter and capture an image with an image sensor in response to the detecting a change between the first frame border and the second frame border, wherein
the change between the first frame border and the second frame border being at least one of a change in aspect ratio, a change in shape, and a change in position. The images may be captured in a viewfinder of at least one of a digital still camera and a digital video recorder in which the first frame border and the second frame border are presented within the viewfinder.

Another feature that may be employed is the determination of a first smaller frame positioned within the first image, and a second smaller frame within the second image, wherein the detecting includes detecting a change of the first frame border and second frame border when a ratio of areas between the first smaller frame to first frame border and a ratio of areas of the second smaller frame to second frame border satisfies a predetermined criteria.

DESCRIPTION OF EMBODIMENTS

Hereinafter, an embodiment of the present invention will be explained with reference to the drawings.

Example of Configuration of Image Processing Apparatus

Figure 1:
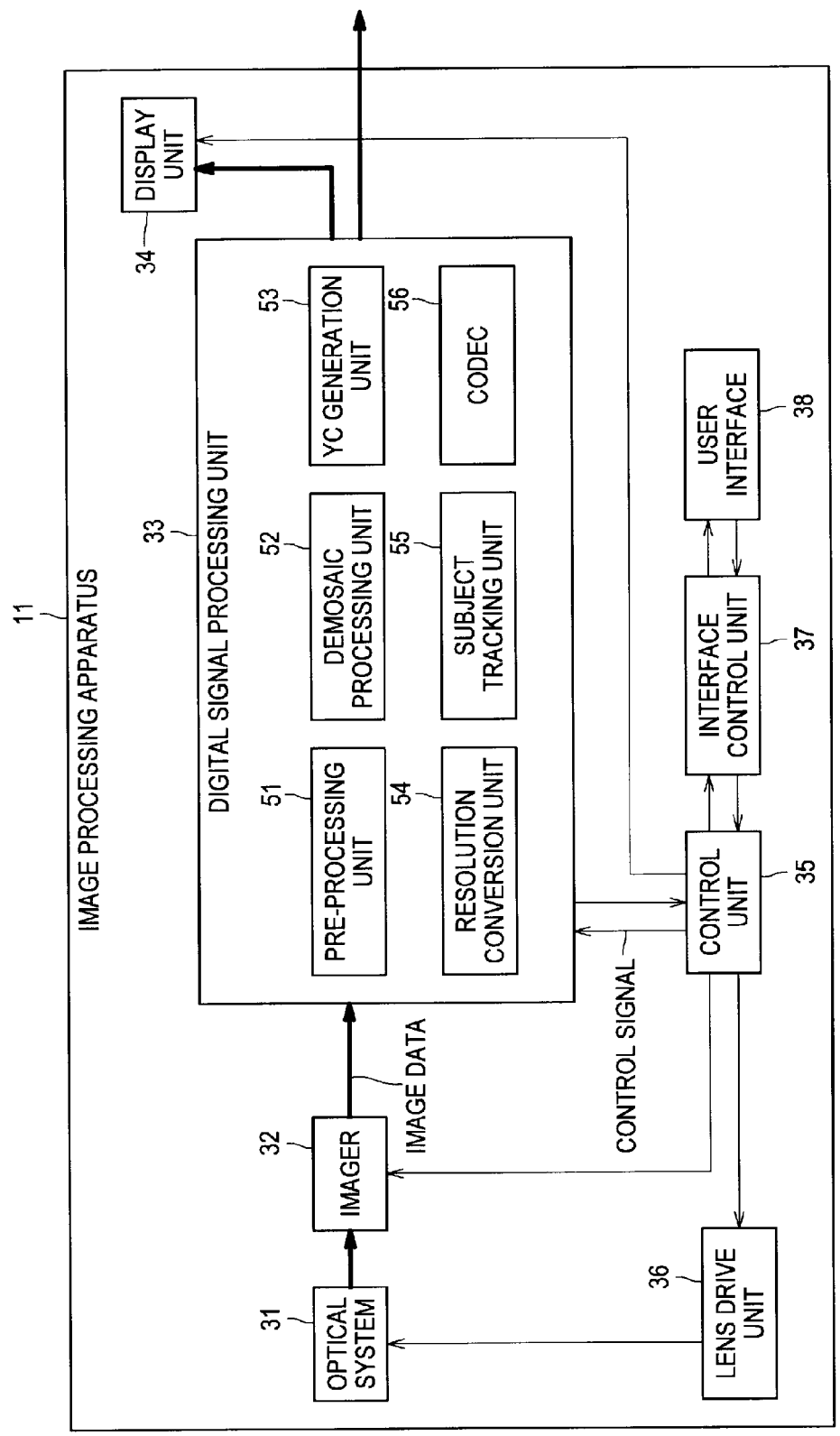
FIG. 1 is a block diagram showing an example of a configuration of an image processing apparatus according to an embodiment of the present invention.

FIG. 1 is a diagram showing an example of a configuration of an image processing apparatus 11 according to the embodiment of the present invention.

The image processing apparatus 11 is provided in an imaging apparatus, such as a digital video camera that captures an image of a moving subject and a digital still camera, for example.

The image processing apparatus 11 includes an optical system 31, an imager 32, a digital signal processing unit 33, a display unit 34, a control unit 35, a lens drive unit 36, an interface control unit 37 and a user interface 38.

The optical system 31 is formed as an optical system that includes an imaging lens (not shown in the drawings). The light entering the optical system 31 is photoelectrically converted by the imager 32 that is formed by imaging elements such as charge coupled devices (CCDs). An electric signal (an analog signal) that has been photoelectrically converted by the imager 32 is converted into image data of a digital signal by an analog to digital (A/D) conversion unit (not shown in the drawings), and the image data is supplied to the digital signal processing unit 33.

The digital signal processing unit 33 performs predetermined signal processing on the image data supplied from the imager 32. The digital signal processing unit 33 includes a pre-processing unit 51, a demosaic processing unit 52, a YC generation unit 53, a resolution conversion unit 54, a subject tracking unit 55 and a CODEC 56.

The pre-processing unit 51 performs, as pre-processing, on the image data from the imager 32, clamp processing that clamps a black level of R, G and B to a predetermined level, correction processing between color channels of R, G and B, and the like. The demosaic processing unit 52 performs, on the image data that has been pre-processed by the pre-processing unit 51, demosaic processing that interpolates color components of pixels so that each pixel of the image data has all color components of R, G and B.

The YC generation unit 53 generates (separates) a luminance (Y) signal and a color (C) signal, from the image data of R, G and B that has been subject to demosaic processing by the demosaic processing unit 52. The resolution conversion unit 54 performs resolution conversion processing on the image data processed by the YC generation unit 53.

The subject tracking unit 55 performs subject tracking processing. The subject tracking processing detects, based on the image data formed by the luminance signal and the color signal generated by the YC generation unit 53, a subject in an input image corresponding to the image data and tracks the subject.

Here, the detection of the subject is performed on the assumption that the subject is an object in the input image that is assumed to attract a user's attention when the user glances at the input image, namely, an object that is assumed to be looked at by the user. Therefore, the subject is not limited to a person.

The subject tracking unit 55 supplies, to the control unit 35, data about a subject frame obtained as a result of the subject tracking processing. The subject frame indicates an area in the input image, the area including the subject. Note that the subject tracking unit 55 will be described in more detail later with reference to FIG. 2.

The CODEC 56 encodes the image data generated by the YC generation unit 53 or the resolution conversion unit 54 and the image data recorded in a DRAM 40, if necessary. Further, the CODEC 56 records the encoded image data in a recording medium (not shown in the drawings) or decodes the encoded image data. The image data decoded by the CODEC 56 or the image data obtained by the resolution conversion unit 54 is supplied to the display unit 34 and is displayed thereon. The display unit 34 is formed by a liquid crystal display, for example. The display unit 34 displays an input image that corresponds to the image data supplied from the digital signal processing unit 33 in accordance with control by the control unit 35.

The control unit 35 controls each unit of the image processing apparatus 11 in accordance with a control signal supplied from the interface control unit 37

For example, the control unit 35 supplies to the digital signal processing unit 33 parameters and the like that are used for various types of signal processing. Further, the control unit 35 acquires data obtained as a result of the various types of signal processing from the digital signal processing unit 33, and supplies the data to the interface control unit 37.

Further, the control unit 35 causes display of the subject frame on the input image displayed on the display unit 34, based on the data about the subject frame supplied from the subject tracking unit 55. The subject frame indicates an area in the input image, the area including the subject.

Further, the control unit 35 drives the imaging lens included in the optical system 31, and supplies a control signal to the lens drive unit 36 to adjust the aperture or the like. Furthermore, the control unit 35 controls capture of an input image by the imager 32.

The user interface 38 includes input devices, such as a button, a lever, a switch, a microphone and the like that are operated when the user inputs a command to the image processing apparatus 11. Further, the user interface 38 includes output devices, such as a lamp, a speaker and the like that present information to the user.

For example, when the button as the user interface 38 is operated, the user interface 38 supplies a control signal in accordance with the operation to the control unit 35 via the interface control unit 37.

Example of Configuration of Subject Tracking Unit

Next, an example of a configuration of the subject tracking unit 55 shown in FIG. 1 will be explained with reference to FIG. 2.

Figure 2:
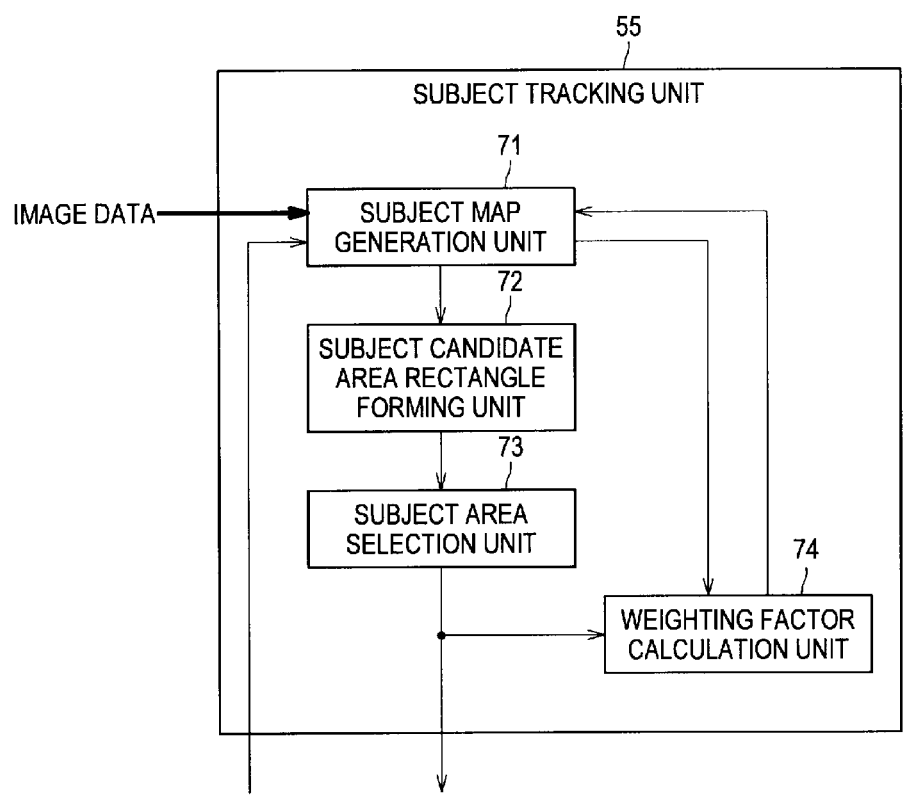
FIG. 2 is a block diagram showing an example of a configuration of a subject tracking unit.

The subject tracking unit 55 shown in FIG. 2 includes a subject map generation unit 71, a subject candidate area rectangle forming unit 72, a subject area selection unit 73, and a weighting factor calculation unit 74.

The subject map generation unit 71 generates, for each feature of the input image such as luminance and color, a saliency map that indicates a feature quantity in a predetermined area of a predetermined frame of the input image, and supplies the generated saliency map to the weighting factor calculation unit 74. Further, the subject map generation unit 71 generates a subject map that indicates a likelihood of an area including a subject in the input image, based on the generated saliency map and a weighting factor for each feature quantity supplied from the weighting factor calculation unit 74.

More specifically, the subject map generation unit 71 performs weighted addition of information (feature quantity) of each area of the saliency map generated for each feature, and thereby generates the subject map. The weighted addition is performed for each area in the same position. The subject map generation unit 71 supplies the generated subject map to the subject candidate area rectangle forming unit 72.

Note that, in each saliency map, an area with a larger amount of information, namely, an area in the input image corresponding to an area with a large feature quantity is an area with a higher possibility of including a subject. Accordingly, based on each saliency map, it is possible to identify, in the input image, the area that includes the subject.

In the subject map supplied from the subject map generation unit 71, the subject candidate area rectangle forming unit 72 obtains an area to be a subject candidate, namely, a rectangular area including the area with a large amount of information in the subject map, and supplies coordinate information indicating coordinates of the rectangular area to the subject area selection unit 73. Further, the subject candidate area rectangle forming unit 72 calculates information relating to the rectangular area (hereinafter referred to as area information) indicated by the coordinate information on the subject map, associates the area information with the coordinate information, and supplies it to the subject area selection unit 73.

Based on the area information supplied from the subject candidate area rectangle forming unit 72, the subject area selection unit 73 selects, from the rectangular area, a subject area that is a rectangular area including a subject of interest, which is a tracking target. Then, the subject area selection unit 73 supplies coordinate information of the subject area to the control unit 35 (refer to FIG. 1) and the weighting factor calculation unit 74.

The weighting factor calculation unit 74 calculates a weighting factor used to weight the saliency map of the next frame that corresponds to a relatively large feature quantity, among the feature quantities in the area corresponding to the subject area on each quantity feature map of a predetermined frame supplied from the subject map generation unit 71. Then, the weighting factor calculation unit 74 supplies the calculated weighting factor to the subject map generation unit 71.

With the above-described configuration, the subject tracking unit 55 can obtain the subject frame indicating the subject area, for each frame of the input image.

Example of Configuration of Subject Map Generation Unit

Next, an example of a configuration of the subject map generation unit 71 shown in FIG. 2 will be explained with reference to FIG. 3.

Figure 3:
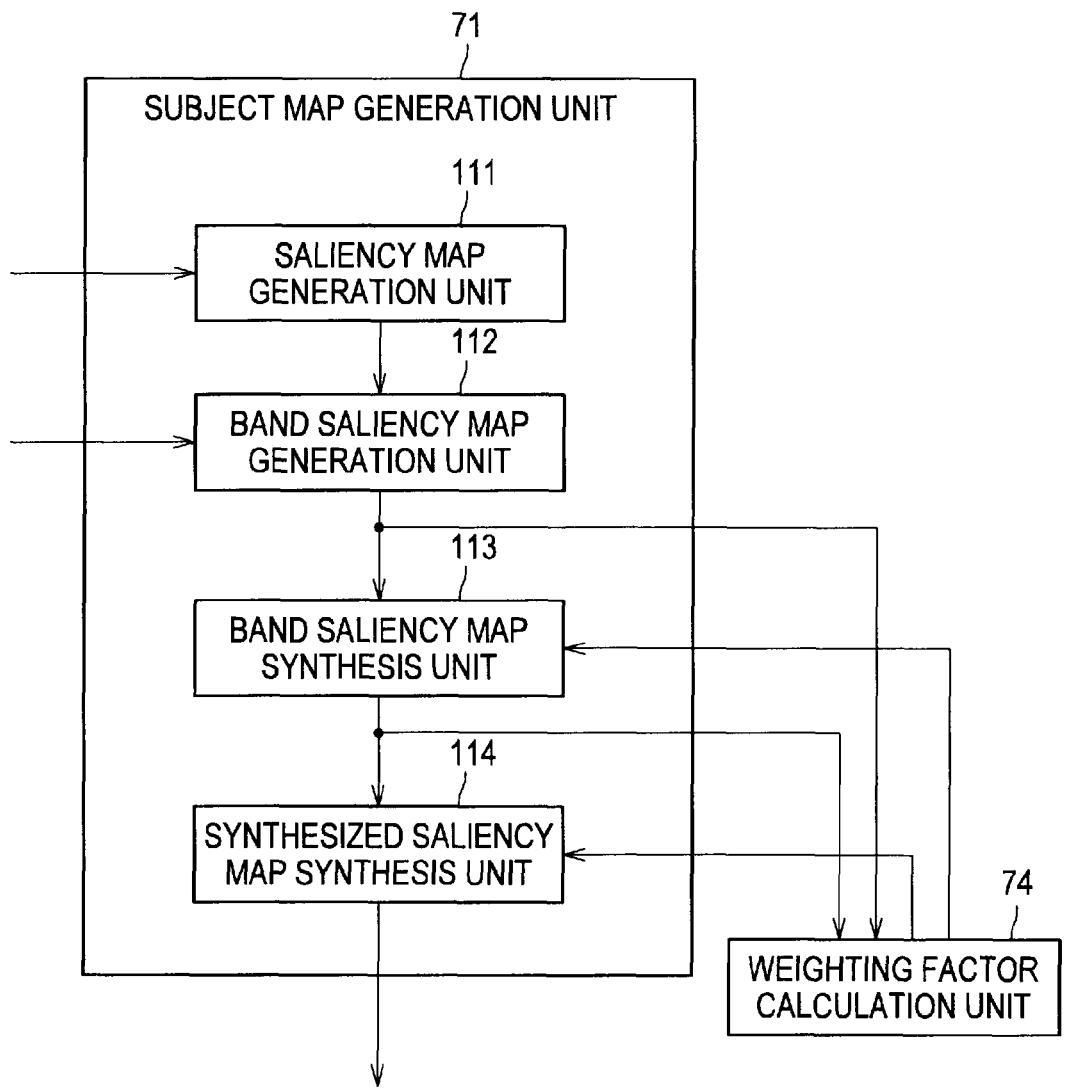
FIG. 3 is a block diagram showing an example of a configuration of a subject map generation unit.

As shown in FIG. 3, the subject map generation unit 71 includes a saliency map generation unit 111, a band saliency map generation unit 112, a band saliency map synthesis unit 113 and a synthesized saliency map synthesis unit 114.

From a predetermined frame of the input image, the saliency map generation unit 111 generates, for each feature quantity, a saliency map that indicates information (feature quantity) relating to features such as luminance and color, and supplies the generated saliency map to the band saliency map generation unit 112.

The band saliency map generation unit 112 extracts a feature quantity of a predetermined band component a predetermined number of times, from the feature quantity in each saliency map supplied from the saliency map generation unit 111, and generates band saliency maps that indicate each extracted feature quantity. Then, the band saliency map generation unit 112 supplies the generated band saliency maps to the weighting factor calculation unit 74 and the band saliency map synthesis unit 113.

The band saliency map synthesis unit 113 synthesizes, for each feature quantity, the band saliency maps supplied from the band saliency map generation unit 112, based on the weighting factor supplied from the weighting factor calculation unit 74, and thereby generates synthesized saliency maps. Then, the band saliency map synthesis unit 113 supplies the synthesized saliency maps to the weighting factor calculation unit 74 and the synthesized saliency map synthesis unit 114.

The synthesized saliency map synthesis unit 114 synthesizes the synthesized saliency maps supplied from the band saliency map synthesis unit 113, based on the weighting factors supplied from the weighting factor calculation unit 74, and thereby generates a subject map. Then, the synthesized saliency map synthesis unit 114 supplies the subject map to the subject candidate area rectangle forming unit 72 (refer to FIG. 2).

Hereinafter, the band saliency map and the synthesized saliency map that are described above are also simply referred to as a saliency map.

Example of Configuration of Subject Candidate Area Rectangle Forming Unit

Next, an example of a configuration of the subject candidate area rectangle forming unit 72 shown in FIG. 2 will be explained with reference to FIG. 4.

Figure 4:
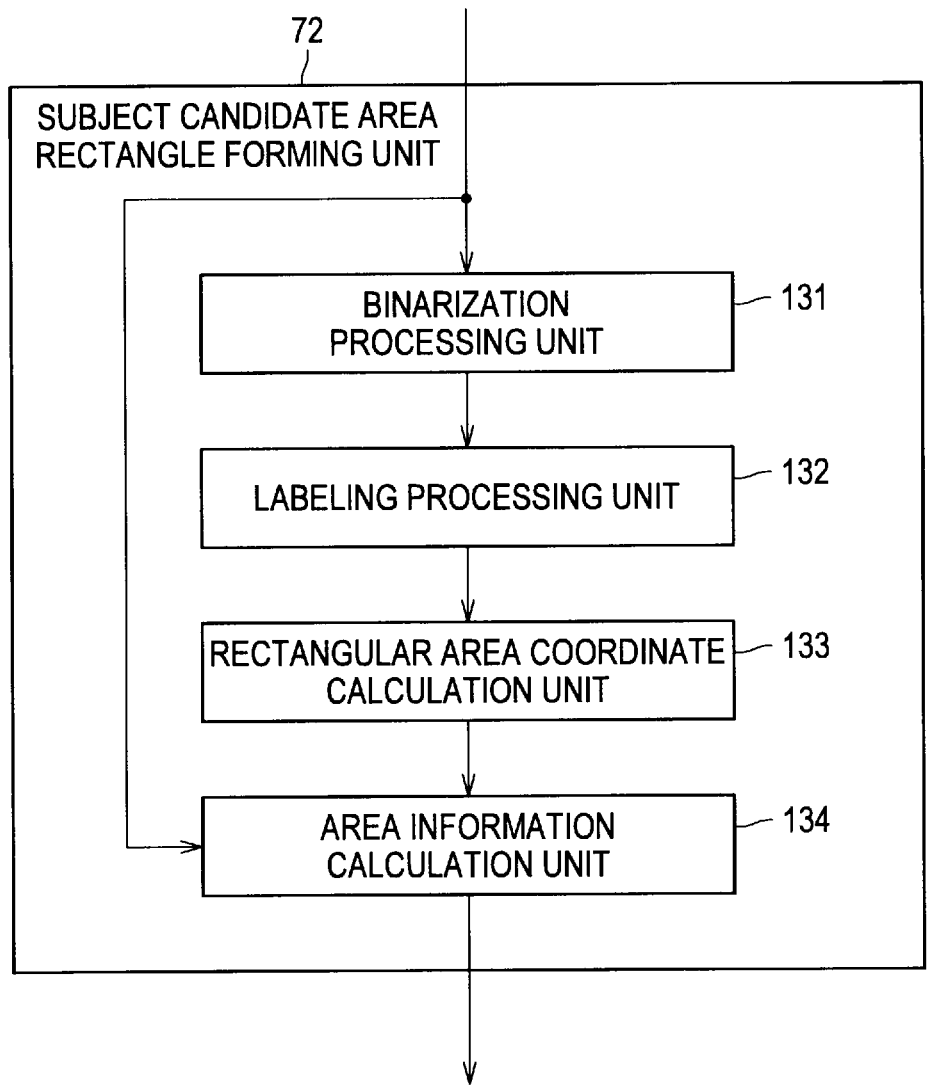
FIG. 4 is a block diagram showing an example of a configuration of a subject candidate area rectangle forming unit.

As shown in FIG. 4, the subject candidate area rectangle forming unit 72 includes a binarization processing unit 131, a labeling processing unit 132, a rectangular area coordinate calculation unit 133 and an area information calculation unit 134.

The binarization processing unit 131 binarizes information, which corresponds to each pixel of the input image in the subject map supplied from the subject map generation unit 71, to a value of 0 or 1 based on a predetermined threshold value, and supplies the value to the labeling processing unit 132. Hereinafter, the information that corresponds to each pixel of the input image in the subject map is also simply referred to as a pixel.

In the binarized subject map supplied from the binarization processing unit 131, the labeling processing unit 132 labels an area in which pixels whose value is 1 are adjacent to each other (hereinafter, the area is referred to as a connected area), and supplies the subject map with the labeled connected area to the rectangular area coordinate calculation unit 133.

In the subject map having the labeled connected area supplied from the labeling processing unit 132, the rectangular area coordinate calculation unit 133 calculates coordinates of a rectangular area including (surrounding) the connected area. Then, the rectangular area coordinate calculation unit 133 supplies coordinate information indicating the coordinates to the area information calculation unit 134 together with the subject map.

The area information calculation unit 134 calculates area information that is information relating to the rectangular area indicated by the coordinate information on the subject map supplied from the rectangular area coordinate calculation unit 133. Then, the area information calculation unit 134 associates the area information with the coordinate information, and supplies it to the subject area selection unit 73 (refer to FIG. 1).

Example of Configuration of Subject Area Selection Unit

Next, an example of a configuration of the subject area selection unit 73 will be explained with reference to FIG. 5.

Figure 5:
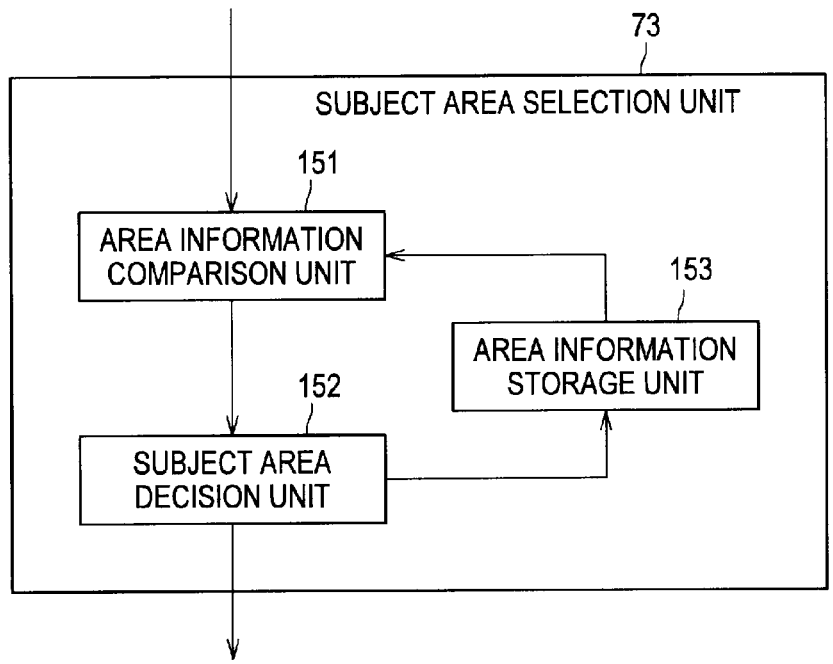
FIG. 5 is a block diagram showing an example of a configuration of a subject area selection unit.

As shown in FIG. 5, the subject area selection unit 73 includes an area information comparison unit 151 and a subject area decision unit 152.

The area information comparison unit 151 compares the area information of each rectangular area supplied from the subject candidate area rectangle forming unit 72 with the area information of the subject area one frame before (e.g., sequential images in time), which is stored in an area information storage unit 153, and supplies a comparison result to the subject area decision unit 152.

Based on the comparison result supplied from the area information comparison unit 151, the subject area decision unit 152 decides, as the subject area, the rectangular area indicated by the coordinate information associated with area information that is closest to the area information of the subject area one frame before. The subject area decision unit 152 supplies coordinate information of the decided subject area to the control unit 35 (refer to FIG. 1) and the weighting factor calculation unit 74 (refer to FIG. 2). At the same time, the subject area decision unit 152 supplies the area information of the subject area to the area information storage unit 153.

The area information storage unit 153 stores the area information of the subject area supplied from the subject area decision unit 152. The area information of the subject area stored in the area information storage unit 153 is read out after one frame by the area information comparison unit 151.

Subject Tracking Processing

Hereinafter, the subject tracking processing of the image processing apparatus 11 will be explained.

Figure 6:
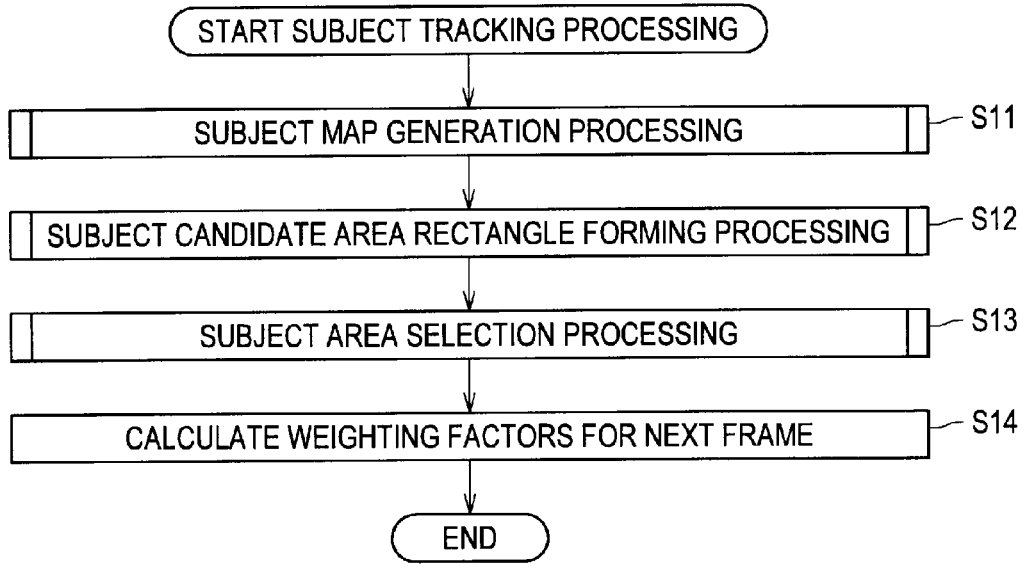
FIG. 6 is a flowchart illustrating subject tracking processing.

FIG. 6 is a flowchart illustrating the subject tracking processing performed by the image processing apparatus 11. The subject tracking processing is started, for example, when the operation mode of the image processing apparatus 11 is shifted to a subject tracking mode that performs the subject tracking processing, by the user operating a button as the user interface 38, and a predetermined area of the subject as a tracking target is selected by the user in the input image displayed on the display unit 34.

At step S11, the subject map generation unit 71 of the subject tracking unit 55 performs subject map generation processing and generates a subject map. The subject map generation unit 71 supplies the subject map to the subject candidate area rectangle forming unit 72.

Subject Map Generation Processing

Figure 7:
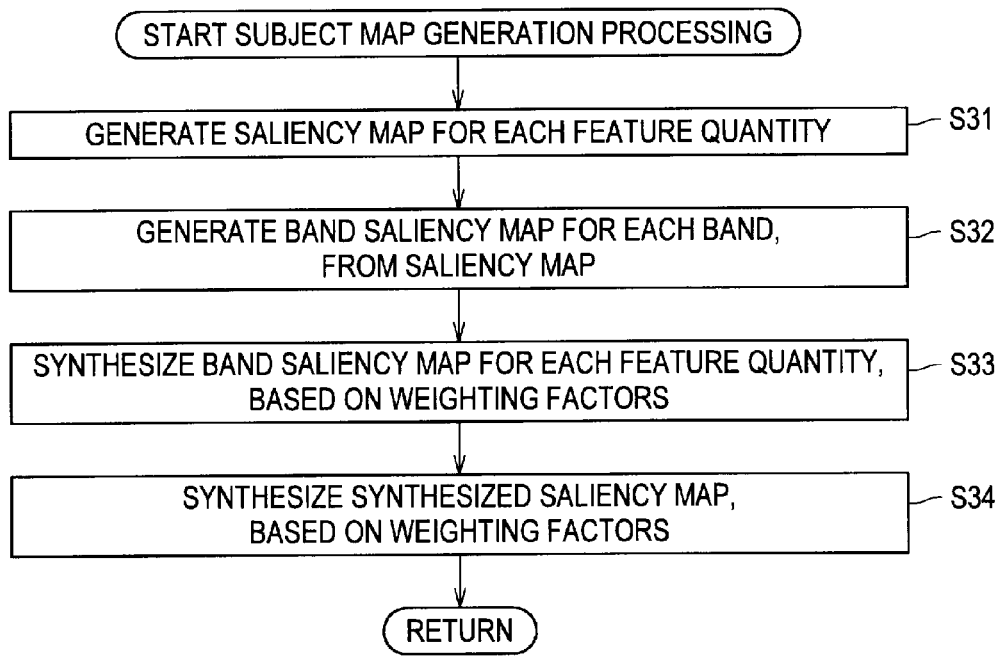
FIG. 7 is a flowchart illustrating subject map generation processing.

Here, with reference to FIG. 7 and FIG. 8, the subject map generation processing will be explained in detail. FIG. 7 is a flowchart illustrating the subject map generation processing, and FIG. 8 is a diagram showing a specific example of the subject map generation processing.

At step S31 of the flowchart shown in FIG. 7, the saliency map generation unit 111 of the subject map generation unit 71 generates a saliency map (for each feature quantity) for each of the features such as luminance and color, from a predetermined frame of an input image. Then, the saliency map generation unit 111 supplies the generated saliency maps to the band saliency map generation unit 112.

Figure 8:
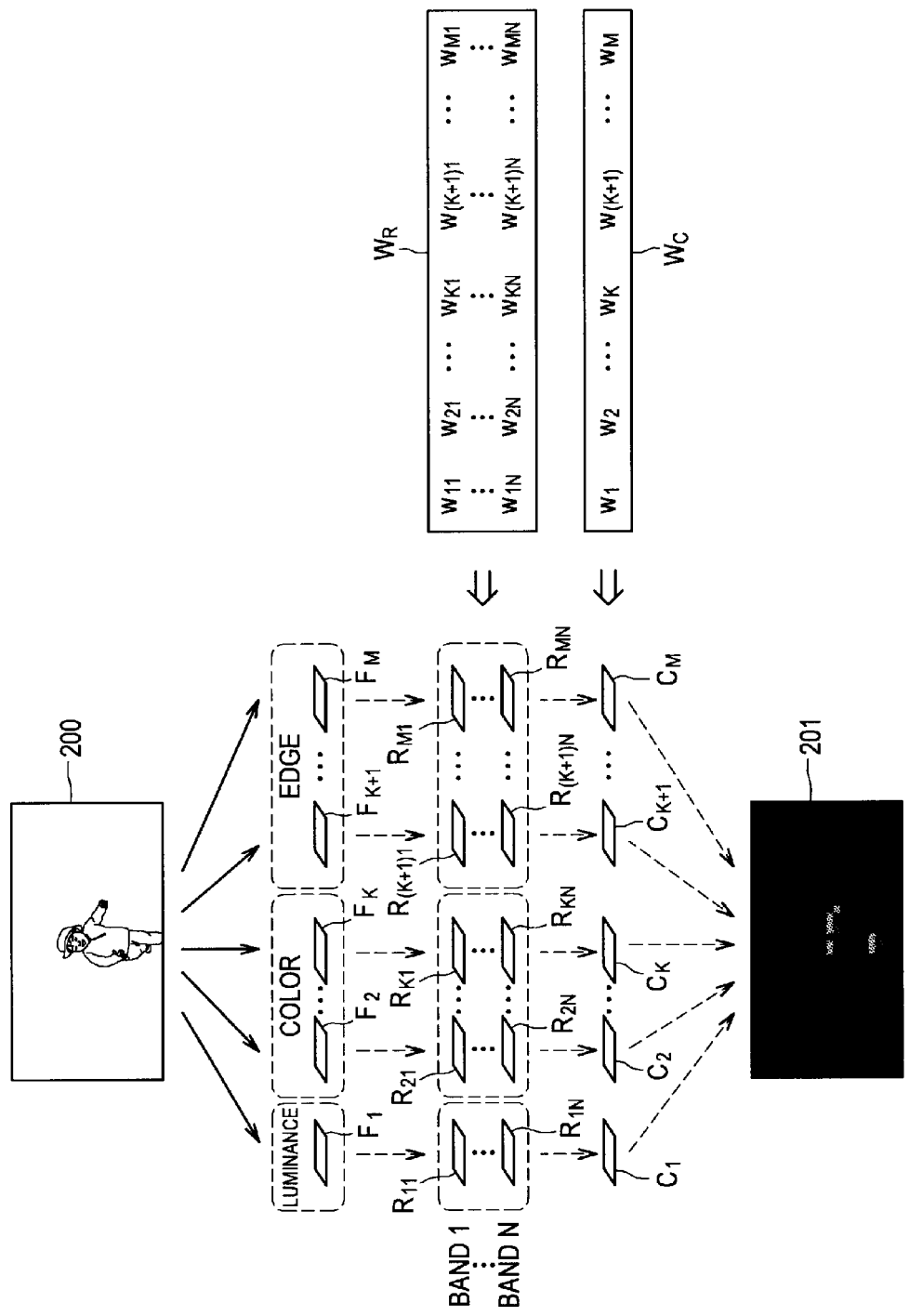
FIG. 8 is a diagram showing a specific example of the subject map generation processing.

More specifically, as shown in FIG. 8, M types of saliency maps are generated from an input image 200. The M types of saliency maps include a luminance information map F1 that indicates information relating to luminance, color information maps F2 to FK that indicate information relating to color, and edge information maps F(K+1) to FM that indicate information relating to edge In the luminance information map F1, a luminance component (a luminance signal) Y that is obtained from each pixel of the input image is taken as information corresponding to each pixel of the input image. In the color information maps F2 to FK, color components (color signals) R, G and B obtained from each pixel of the input image are taken as information corresponding to each pixel of the input image. Further, in the edge information maps F(K+1) to FM, edge intensities in the directions of 0 degree, 45 degree, 90 degree and 135 degree in each pixel of the input image, for example, are taken as information corresponding to each pixel of the input image.

Note that, with respect to the above-described saliency maps, an average value of values of the respective components of R, G and B of the pixel may be used as information (feature quantity) of the luminance information map F1, and color difference components Cr and Cb, or an a* coordinate component and a b* coordinate component in a Lab color space may be used as information of the color information maps F2 to FK. Further, edge intensities in directions other than the directions of 0 degree, 45 degree, 90 degree and 135 degree may be used as information of the edge information maps F(K+1) to FM.

At step S32, the band saliency map generation unit 112 extracts a feature quantity of a predetermined band component, N times, from the feature quantity in each saliency map, and generates band saliency maps that indicate each extracted feature quantity. Then, the band saliency map generation unit 112 supplies the generated band saliency maps to the weighting factor calculation unit 74 and the band saliency map synthesis unit 113.

More specifically, as shown in FIG. 8, luminance information of band 1 to band N is extracted from luminance information in the luminance map F1, and band luminance information maps R11 to R1N are generated that indicate luminance information of each of the bands. Further, color information of band 1 to band N is extracted from color information in the color information maps F2 to FK, and band color information maps R21 to R2N, . . . , RK1 to RKN are generated that indicate color information of each of the bands. Further, edge information of band 1 to band N is extracted from edge information in the edge information maps F(K+1) to FM, and band edge information maps R(K+1) 1 to R(K+1) N, . . . , RM1 to RMN are generated that indicate edge information of each of the bands. In this manner, the band saliency map generation unit 112 generates (M×N) types of band saliency map.

Here, an example of processing performed by the band saliency map generation unit 112 will be explained.

For example, the band saliency map generation unit 112 uses each saliency map to generate a plurality of saliency maps having resolutions different from each other, and represents the saliency maps as pyramid images of the corresponding feature quantity. For example, pyramid images in eight layers of resolution of level L1 to level L8 are generated. It is assumed that the pyramid image of level L1 has the highest resolution and the resolutions of the pyramid images become lower in order from level L1 to level L8.

In this case, the saliency map generated by the saliency map generation unit 111 is represented as the pyramid image of level L1. Further, an average value of pixel values of four pixels that are adjacent to each other in a pyramid image of level Li (where i=1 or i=7 or 1<i<7) is taken as a pixel value of one pixel of a pyramid image of level L(i+1) that corresponds to the adjacent four pixels. Accordingly, the pyramid image of level L(i+1) is a half image (rounded down if not divisible), in height and width, of the pyramid image of level Li.

Further, the band saliency map generation unit 112 selects two pyramid images in different layers from among the plurality of pyramid images, and obtains a difference between the selected pyramid images, thereby generating an N number of difference images of each feature quantity. Note that, since the pyramid images in the respective layers are different in size (different in number of pixels), at the time of the generation of a difference image, a smaller pyramid image is up-converted in accordance with the size of a larger image.

For example, among the pyramid images of feature quantities in the respective layers, the band saliency map generation unit 112 obtains a difference between the pyramid images in combinations of the respective layers of level L6 and level L3, level L7 and level L3, level L7 and level L4, level L8 and level L4, and level L8 and level L5. Thus, difference images of a total of five feature quantities are obtained.

More specifically, for example, in a case where the difference image of the combination of level L6 and level L3 is generated, the pyramid image of level L6 is up-converted in accordance with the size of the pyramid image of level L3. Namely, the pixel value of one pixel in the pyramid image of level L6 before up-conversion is taken as the pixel value of some pixels adjacent to each other in the pyramid image of level L6 after up-conversion. Then, a difference between the pixel value of the pixel in the pyramid image of level L6 and the pixel value of the pixel in the pyramid image of level L3 located in the same position as the pixel in the pyramid image of level L6 is obtained, and the difference is taken as the pixel value of the pixel in the difference image.

By generating a difference image in this manner, it is possible to extract a feature quantity of a predetermined band component from the saliency map, as if filter processing using a band pass filter is applied to the saliency map.

Note that, in the above description, although the width of the band extracted from the saliency map is determined by the combination of the respective layers of pyramid images when the difference image is obtained, the combination can be decided as desired.

Further, the extraction of the feature quantity of a predetermined band component is not limited to the above-described technique using a difference image, and another technique may be used.

Returning to the flowchart in FIG. 7, at step S33, the band saliency map synthesis unit 113 synthesizes, for each feature quantity, the band saliency maps supplied from the band saliency map generation unit 112, based on a group of weighting factors WR supplied from the weighting factor calculation unit 74. The band saliency map synthesis unit 113 supplies the synthesized band saliency map s (synthesized saliency maps) to the weighting factor calculation unit 74 and the synthesized saliency map synthesis unit 114.

More specifically, as shown in FIG. 8, weighted addition of the band luminance information maps R11 to R1N is performed using weighting factors w11 to w1N that are weights for each of the band luminance information maps supplied from the weighting factor calculation unit 74, and a synthesized saliency map C1 is obtained. Further, weighted addition of the band color information maps R21 to R2N, ..., RK1 to RKN is performed using weighting factors w21 to w2N, ..., wK1 to wKN that are weights for each of the band color information maps supplied from the weighting factor calculation unit 74, and synthesized saliency maps C2 to CK are obtained. Further, weighted addition of the band edge information maps R(K+1) 1 to R(K+1) N, ..., RM1 to RMN is performed using weighting factors w(K+1) 1 to w(K+1) N, ..., wM1 to wMN that are weights for each of the band edge information maps supplied from the weighting factor calculation unit 74, and synthesized saliency maps CK+1 to CM are obtained. In this manner, the band saliency map synthesis unit 113 generates M types of synthesized saliency map. Note that, although the group of weighting factors WR will be described in more detail later, the respective weighting factors of the group of weighting factors WR have a value from 0 to 1. However, when the subject map generation processing is performed for the first time, the respective weighting factors of the group of weighting factors WR are all set to 1, and the band saliency maps are added without weight.

At step S34, the synthesized saliency map synthesis unit 114 synthesizes the synthesized saliency maps supplied from the band saliency map synthesis unit 113, based on a group of weighting factors WC supplied from the weighting factor calculation unit 74, and thereby generates a subject map and supplies the subject map to the subject candidate area rectangle forming unit 72.

More specifically, as shown in FIG. 8, the synthesized saliency maps C1 to CM are linearly coupled using weighting factors w1 to wM that are weights for each of the band luminance information maps supplied from the weighting factor calculation unit 74. Further, the pixel value of the map obtained as a result of the linear coupling is multiplied by a subject weight, which is a weight obtained in advance, and is normalized, thereby obtaining a subject map 201. Note that, although the group of weighting factors WC will be described in more detail later, the respective weighting factors of the group of weighting factors WC have a value from 0 to 1. Note, however, that when the subject map generation processing is performed for the first time, the respective weighting factors of the group of weighting factors WC are all set to 1, and the synthesized saliency maps are linearly coupled without weight.

In other words, if a position (pixel) of interest on the subject map to be obtained is taken as a target position, the pixel value of the same position (pixel) as the target position on each of the synthesized saliency maps is multiplied by the weighting factor for each of the synthesized saliency maps, and a sum of the pixel values multiplied by the weighting factors is taken as the pixel value of the target position. Further, the pixel value of each position on the subject map obtained in this manner is multiplied by the subject weight, which has been obtained in advance for the subject map, and is normalized, thereby obtaining a final subject map. For example, normalization is performed such that the pixel value of each pixel of the subject map is a value from 0 to 255.

In the manner described above, the subject map generation unit 71 generates the band saliency maps and the synthesized saliency maps, from the saliency maps, and thereby generates the subject map.

Returning to the flowchart in FIG. 6, at step S12, the subject candidate area rectangle forming unit 72 performs subject candidate area rectangle forming processing, and obtains a rectangular area including an area to be a subject candidate, in the subject map supplied from the subject map generation unit 71.

Subject Candidate Area Rectangle Forming Processing

Figure 9:
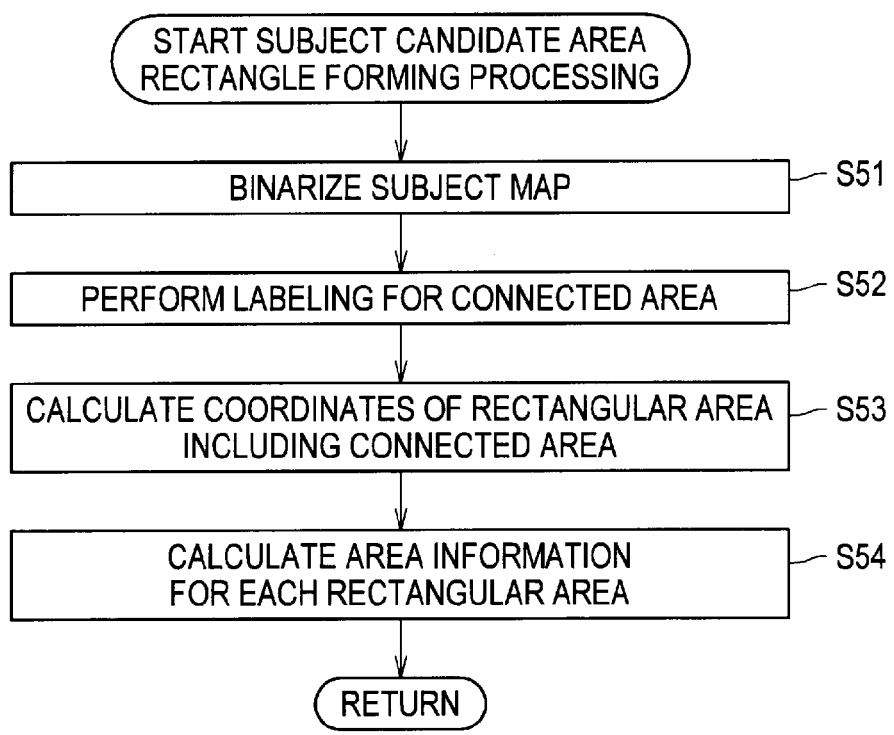
FIG. 9 is a flowchart illustrating subject candidate area rectangle forming processing.

The subject candidate area rectangle forming processing will now be explained in detail with reference to FIG. 9 and FIG. 10. FIG. 9 is a flowchart illustrating the subject candidate area rectangle forming processing, and FIG. 10 is a diagram showing a specific example of the subject candidate area rectangle forming processing.

At step S51 of the flowchart shown in FIG. 9, the binarization processing unit 131 of the subject candidate area rectangle forming unit 72 binarizes information in the subject map supplied from the subject map generation unit 71 to one of the values 0 and 1 based on a predetermined threshold value, and supplies the values to the labeling processing unit 132.

Figure 10:
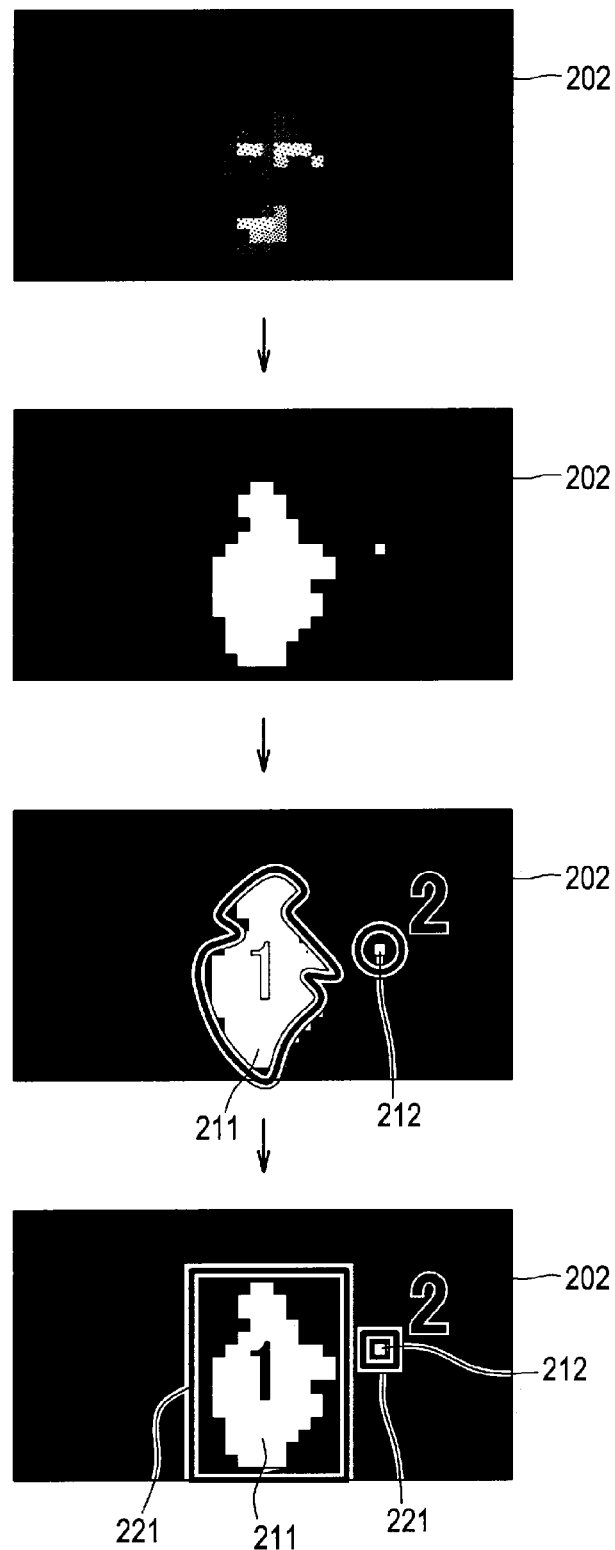
FIG. 10 is a diagram showing a specific example of the subject candidate area rectangle forming processing.

More specifically, with respect to the pixel value (which is a value from 0 to 255) of each of the pixels in the subject map 201 shown at the top of FIG. 10, the binarization processing unit 131 sets 0 as a pixel value that is smaller than a threshold value 127, and sets 1 as a pixel value that is equal to or larger than the threshold value 127. Thus, a binarized map 202 is obtained, an example of which is shown second from the top of FIG. 10. In the binarized map 202 shown in FIG. 10, a section (pixels) shown in white has the pixel value of 1, and a section (pixels) shown in black has the pixel value of 0. Note that, although it is assumed here that the threshold value is 127, it may be another value.

At step S52, in the binarized map 202 (the binarized subject map) supplied from the binarization processing unit 131, the labeling processing unit 132 performs labeling on a connected area in which the pixels whose pixel value is 1 are adjacent to each other, which is obtained by a morphological operation, for example. Then, the labeling processing unit 132 supplies the binarized map 202 to the rectangular area coordinate calculation unit 133.

More specifically, for example, as shown by the third map from the top in FIG. 10, in the binarized map 202, a connected area 211 is labeled by a label "1" and a connected area 212 is labeled by a label "2".

At step S53, in the binarized map 202 supplied from the labeling processing unit 132, the rectangular area coordinate calculation unit 133 calculates coordinates of rectangular areas respectively including (surrounding) the connected areas 211 and 212. Then, the rectangular area coordinate calculation unit 133 supplies coordinate information indicating the coordinates of the rectangular areas to the area information calculation unit 134 together with the binarized map 202.

More specifically, as shown by the fourth map from the top in FIG. 10, in the binarized map 202, a rectangular frame (a circumscribing frame) 221 that outwardly surrounds the connected area 211 labeled by the label "1" is detected, and coordinates of the upper left vertex and the lower right vertex in the drawing, for example, of the rectangular frame 221 are obtained. Further, a rectangular frame 222 that outwardly surrounds the connected area 212 labeled by the label "2" is detected, and coordinates of the upper left vertex and the lower right vertex in the drawing, for example, of the rectangular frame 222 are obtained.

At step S54, the area information calculation unit 134 calculates area information about the rectangular areas surrounded by the rectangular frames on the subject map, based on the coordinate information supplied from the rectangular area coordinate calculation unit 133 and the subject map supplied from the subject map generation unit 71.

More specifically, based on the coordinate information supplied from the rectangular area coordinate calculation unit 133, which indicates the rectangular frames 221 and 222 in the binarized map 202, the area information calculation unit 134 calculates the size of each of the rectangular frames 221 and 222 and coordinates of the center position of each of the rectangular frames 221 and 222 as area information about each rectangular area. The area information calculation unit 134 associates the calculated area information with the coordinate information supplied from the rectangular area coordinate calculation unit 133, and supplies the associated area information to the subject area selection unit 73.

In the manner described above, the subject candidate area rectangle forming unit 72 obtains, in the subject map, the rectangular frames that surround each area to be a candidate for the subject of interest, and the area information indicating the feature of the areas surrounded by the rectangular frames on the subject map. The rectangular frames are defined by a border positioned within a boundary of the image in which it is disposed.

Returning to the flowchart in FIG. 6, at step S13, the subject area selection unit 73 performs subject area selection processing, and selects a subject area that is a rectangular area including the subject of interest, from among the rectangular areas, based on the area information supplied from the subject area selection unit 73.

Subject Area Selection Processing

Figure 11:
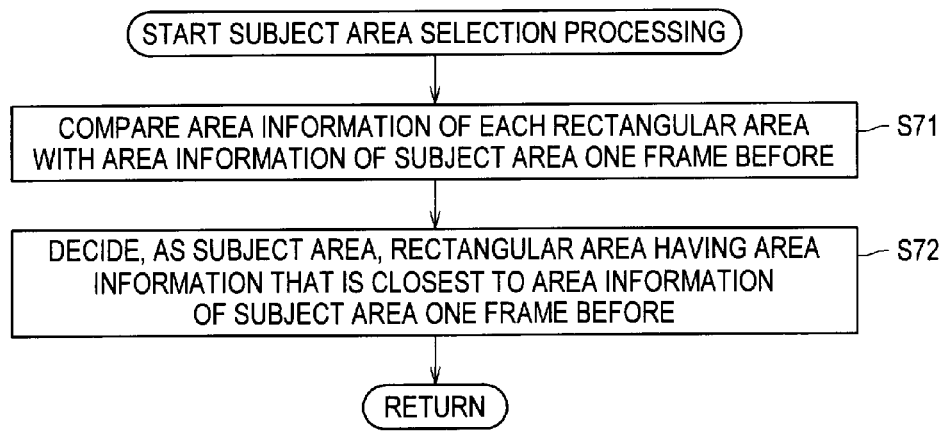
FIG. 11 is a flowchart illustrating subject area selection processing.

Here, with reference to a flowchart in FIG. 11, the subject area selection processing will be explained in more detail.

At step S71, the area information comparison unit 151 compares the area information of each rectangular area, which is supplied from the subject candidate area rectangle forming unit 72, with the area information of the subject area one frame before, which is stored in the area information storage unit 153, and supplies a comparison result to the subject area decision unit 152.

More specifically, for example, the area information comparison unit 151 compares the size of the rectangular frame that surrounds each rectangular area on the subject map, which is supplied from the subject candidate area rectangle forming unit 72, with the size of the rectangular frame (the subject frame) that surrounds the subject area one frame before, which is stored in the area information storage unit 153. While area of the frame border is one featured that can be detected, other relative attributes of the frame may be detected between successive frames, such as position, shape and aspect ratio. Further, for example, the area information comparison unit 151 compares the coordinates of the center position of the rectangular frame that surrounds each rectangular area on the subject map, which are supplied from the subject candidate area rectangle forming unit 72, with the coordinates of the center position of the rectangular frame (the subject frame) that surrounds the subject area one frame before, which are stored in the area information storage unit 153.

At step S72, based on the comparison result from the area information comparison unit 151, the subject area decision unit 152 decides, as the subject area, one of a rectangular area having the size of the rectangular frame (the subject frame) that surrounds the subject area one frame before, a rectangular area having the size of the rectangular frame that is closest to the coordinates of the center position, and a rectangular area including the center position. The subject area decision unit 152 supplies coordinate information of the decided subject area to the control unit 35 and the weighting factor calculation unit 74. At the same time, the subject area decision unit 152 supplies area information (the size or the center position of the subject frame) of the decided subject area to the area information storage unit 153.

Note that, when the subject area selection processing is performed for the first time, the area information of the subject area one frame before is not stored in the area information storage unit 153. Therefore, the rectangular area including a predetermined area of the subject selected by the user at the time of the start of the subject tracking processing (hereinafter, the predetermined area is referred to as an initially selected area) is set as the subject area.

In the manner described above, the subject area selection unit 73 selects the subject area of the subject of interest, from the rectangular areas that are subject candidates.

Calculation of Weighting Factors

Returning to the flowchart in FIG. 6, at step S14, the weighting factor calculation unit 74 calculates the group of weighting factors WR and the group of weighting factors WC shown in FIG. 8, based on the band saliency map and the synthesized saliency map supplied from the subject map generation unit 71, and on the coordinate information indicating the subject area supplied from the subject area selection unit 73.

Figure 12:
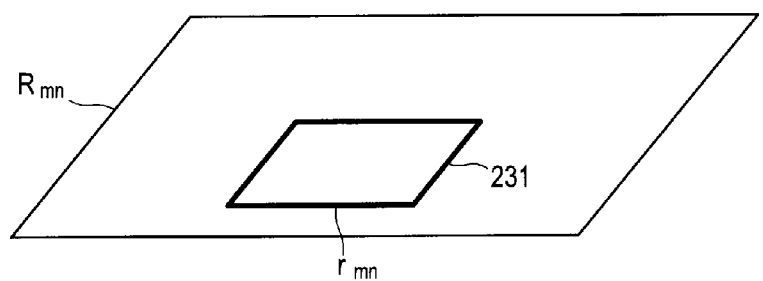
FIG. 12 is a diagram illustrating a sum of subject area feature quantities of a band saliency map.
Figure 13:
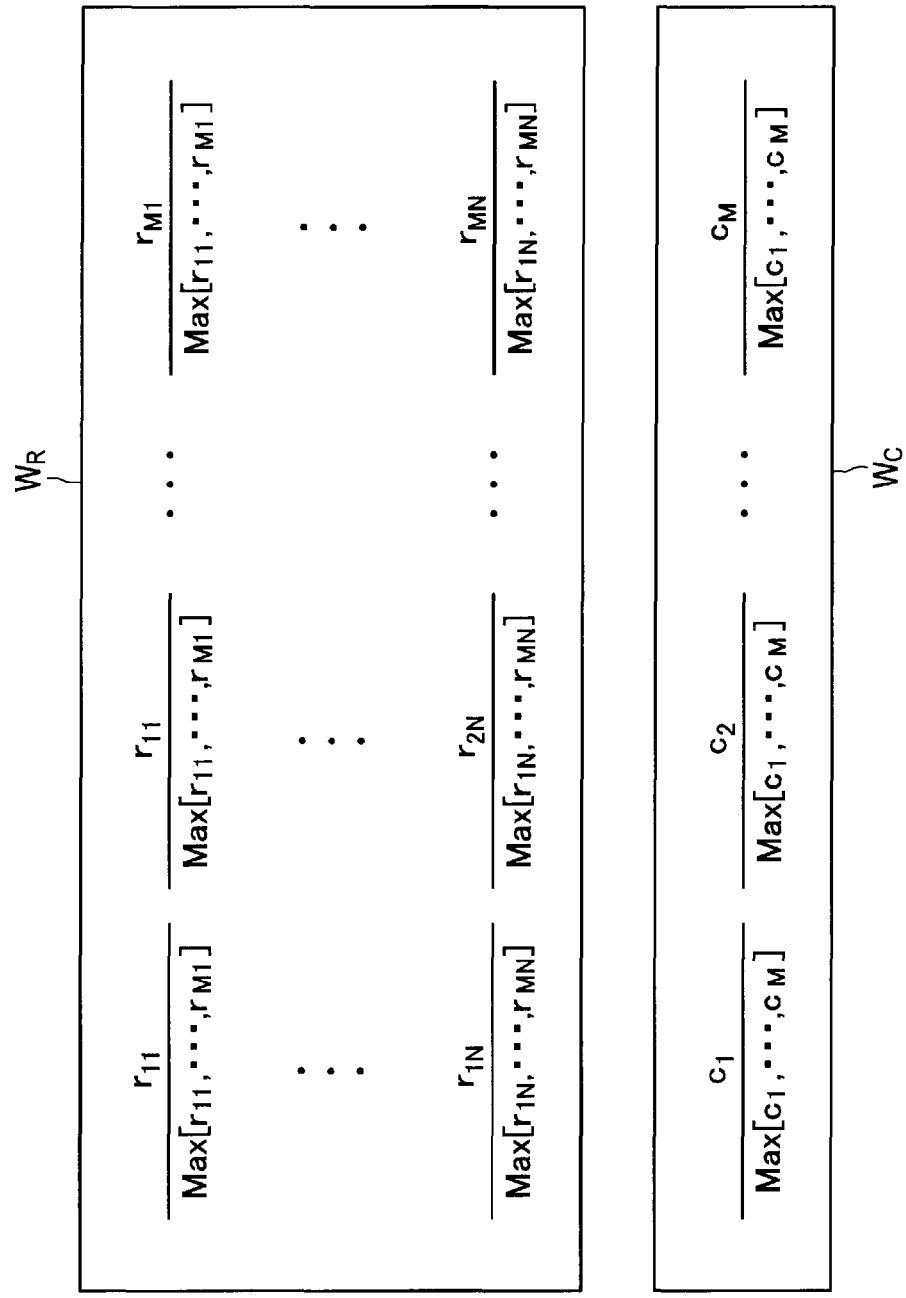
FIG. 13 is a diagram illustrating weighting factors.

More specifically, as shown in FIG. 12, if a sum of feature quantities (information quantities) in a rectangular area corresponding to a subject frame 231 that represents the subject area on a predetermined band saliency map Rmn (1=m or 1<m<M or m=M, 1=n or 1<n<N or n=N) is taken as a sum rmn of subject area feature quantities, the group of weighting factors WR shown in the upper section of FIG. 13 is calculated.

The respective factors in the group of weighting factors WR shown in FIG. 13 correspond to the respective weighting factors w11 to wMN shown in FIG. 8. Note that, in FIG. 13, Max (a, . . . , z) indicates the maximum value among the values a to z.

For example, the respective factors in the first row from the top in the group of weighting factors WR shown in FIG. 13 indicate the weighting factors w11 to wM1 with respect to band saliency maps R11 to RM1 for each feature quantity corresponding to "band 1" shown in FIG. 8. As shown in FIG. 13, the weighting factors w11 to wM1 are factors that take a value from 0 to 1 such that their denominators are maximum values among sums r11 to rM1 of subject area feature quantities for the respective band saliency maps R11 to RM1, and their numerators are the sums r11 to rM1 of the subject area feature quantities for the respective band saliency maps R11 to RM1.

In a similar manner, the respective factors in the N-th row from the top in the group of weighting factors WR shown in FIG. 13 indicate the weighting factors w1N to wMN with respect to band saliency maps R1N to RMN for each feature quantity corresponding to "band N" shown in FIG. 8. As shown in FIG. 13, the weighting factors w1N to wMN are factors that take a value from 0 to 1 such that their denominators are maximum values among sums r1N to rMN of subject area feature quantities for the respective band saliency maps R1N to RMN, and their numerators are the sums r1N to rMN of the subject area feature quantities for the respective band saliency maps R1N to RMN.

In other words, according to the weighting factors w1$n$ to wMn, among the band saliency maps R1$n$ to RMn for each feature quantity corresponding to "band n", weighting is performed such that the maximum value becomes 1 for the band saliency map of the feature quantity in which the sum of the subject area feature quantities becomes the largest, and weighting corresponding to the sum of the subject area feature quantities is performed for the other band saliency maps.

Further, if a sum of feature quantities (information quantities) in a rectangular area corresponding to the rectangular frame 221 that indicates the subject area on a predetermined band saliency map Cm (1=m or 1<m<M or m=M) is taken as a sum cm of subject area feature quantities, the group of weighting factors WC shown in the lower section of FIG. 13 is calculated.

The respective factors in the group of weighting factors WC shown in FIG. 13 correspond to the respective weighting factors w1 to wM shown in FIG. 8.

More specifically, the respective factors in the group of weighting factors WC shown in FIG. 13 indicate the weighting factors w1 to wM for the synthesized saliency maps C1 to CM for each feature quantity shown in FIG. 8. As shown in FIG. 13, the weighting factors w1 to wM are factors that take a value from 0 to 1 such that their denominators are maximum values among sums c1 to cM of subject area feature quantities for the respective synthesized saliency maps C1 to CM, and their numerators are the sums c1 to cM of the subject area feature quantities for the respective synthesized saliency maps C1 to CM.

In other words, according to the weighting factors w1 to wM, among the synthesized saliency maps C1 to CM for each feature quantity, weighting is performed such that the maximum value becomes 1 for the synthesized saliency map of the feature quantity in which the sum of the subject area feature quantities becomes the largest, and weighting corresponding to the sum of the subject area feature quantities is performed for the other synthesized saliency maps.

The weighting factor calculation unit 74 supplies the calculated group of weighting factors WR to the band saliency map synthesis unit 113 of the subject map generation unit 71. At the same time, the weighting factor calculation unit 74 supplies the group of weighting factors WC to the synthesized saliency map synthesis unit 114 of the subject map generation unit 71. In the flowchart shown in FIG. 6, after performing step S14, the subject tracking processing for the next frame is performed, and this processing is repeatedly performed for each frame.

With the above-described processing, in the saliency map for each feature quantity relating to a predetermined frame of an input image, in accordance with a relative magnitude of the feature quantity of the area corresponding to the subject area selected in that frame, the weighting factor with respect to the saliency map for each feature quantity for the next frame is decided. Therefore, even in a case where feature quantities vary between frames, a subject map is generated such that the largest weighting is applied to the saliency map of a feature quantity that most appropriately represents the subject among a plurality of feature quantities. Therefore, even in an environment in which the state of the subject varies, it is possible to track the subject more stably.

Further, since the subject area is decided such that it includes the whole subject, even in an environment in which the state of a part of the subject area varies, it is possible to track the subject more stably.

In a known subject tracking technique, particularly in a case where one of the coordinates in the subject area (or a part of the area including the coordinate) is identified, the whole subject cannot be tracked, and detection frames for auto focus (AF), auto exposure (AE) and auto color control (ACC) cannot be set properly. In a case where a same feature quantity area, which is within the subject area and has the same feature quantity, is identified, accuracy to set a detection frame can be increased compared to the above-described case. However, in many cases, the same feature quantity area is only a small part of the subject area, and sufficient detection accuracy therefore cannot be obtained.

On the other hand, according to the above-described subject tracking processing, the subject area including the whole subject can be identified. Therefore, it is possible to increase detection accuracy, and it is also possible to apply a tracking result to a variety of applications.

Further, a subject tracking technique is also known that detects and tracks a person by registering a person's whole image in a dictionary through learning, for example. However, it is not possible to track a subject other than the person or persons registered in the dictionary. Moreover, the amount of information (images) registered in the dictionary becomes a significant amount, which results in a large apparatus size.

On the other hand, with the above-described subject tracking processing, it is possible to detect and track any given subject, and further, there is no need to register a significant amount of information in a dictionary or the like. Therefore, it is possible to achieve a compact apparatus size.

In the above description, a luminance component, a color component and an edge direction are used as a feature quantity. However, the present invention is not limited to these examples and, for example, motion information may be added. Further, it is preferable, for example, to use feature quantities having a complementary relationship, such as a luminance component and a color component, and such feature quantities may be appropriately selected.

In addition, in the above description, M×(N+1) types of weighting factor are calculated corresponding to M×(N+1) types of saliency map. However, by appropriately calculating only weighting factors that correspond to some of the saliency maps, it is possible to reduce a calculation amount in the image processing apparatus 11. For example, only weighting factors w1 to wM corresponding to the M types of saliency map of the synthesized saliency maps C1 to CM may be calculated.

Further, in the above description, the area information calculation unit 134 calculates the size of the rectangular frame and the coordinates of the center position of the rectangular frame, as area information of the rectangular area. However, the area information calculation unit 134 may calculate an integral value or a peak value (a maximum value) of pixel values within the rectangular area. In this case, in the subject area selection processing (refer to FIG. 11), a rectangular area having an integral value or a peak value of pixel values within an area that is closest to an integral value or a peak value of pixel values within the subject area one frame before is taken as a subject area.

If the image processing apparatus 11 is a digital still camera that captures still images, the user captures a still image by performing a shutter operation, using a shutter triggered by a shutter triggering mechanism, at a desired timing while confirming video (finder images presented in a view finder) displayed on the display unit 34.

As an example of an application to which a tracking result of the above-described subject tracking processing is applied, it is possible to cause the image processing apparatus 11 formed as described above to perform automatic shutter processing, instead of a shutter operation by the user. The automatic shutter processing can capture a still image in response to a change in a state of a tracked subject.

Example of Functional Configuration of Control Unit

Here, a functional configuration of the control unit 35 that performs the automatic shutter processing will be explained with reference to FIG. 14. The automatic shutter processing captures a still image in response to a change in the state of the subject tracked by the above-described subject tracking processing.

Figure 14:
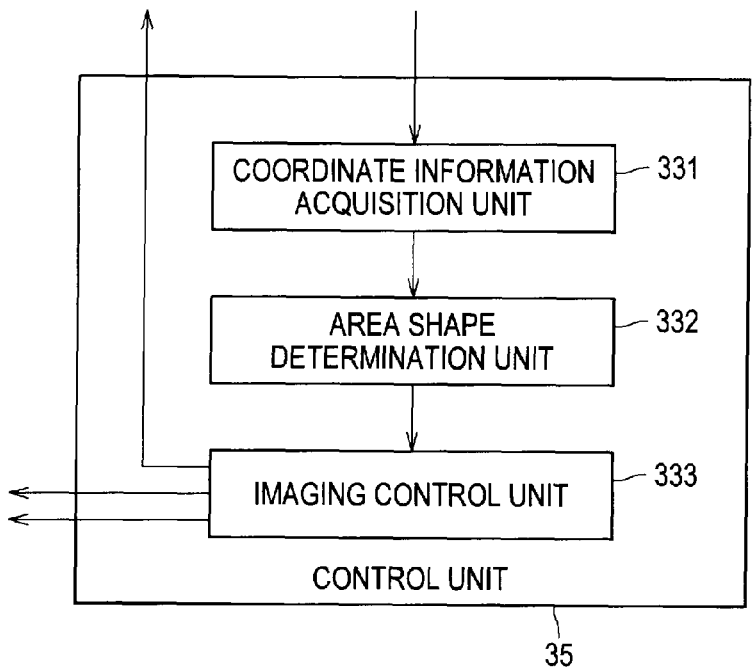
FIG. 14 is a block diagram showing an example of a functional configuration of a control unit.

The control unit 35 shown in FIG. 14 is provided with a coordinate information acquisition unit 331, an area shape determination unit 332 and an imaging control unit 333.

The coordinate information acquisition unit 331 acquires coordinate information of the subject area that is supplied for each input image frame from the subject tracking unit 55 (refer to FIG. 1), and supplies the coordinate information to the area shape determination unit 332.

The area shape determination unit 332 determines a change in the shape of the subject area between input image frames, based on the coordinate information of the subject area supplied from the coordinate information acquisition unit 331. More specifically, the area shape determination unit 332 determines a change, between the frames, of the aspect ratio of the subject area, which is a rectangular area expressed by coordinate information of the subject area, and supplies information in accordance with a determination result to the imaging control unit 333.

The imaging control unit 333 controls the imager 32, the digital signal processing unit 33 and the lens drive unit 36 based on the information supplied from the area shape determination unit 332, and thereby controls drive of the imaging lens, aperture adjustment, signal processing on image data, recording on a recording medium (not shown in the drawings) and the like. In summary, the imaging control unit 333 controls image capture performed by the image processing apparatus 11.

Automatic Shutter Processing

Next, the automatic shutter processing performed by the image processing apparatus 11 will be explained with reference to a flowchart shown in FIG. 15.

At step S311, the subject tracking unit 55 performs the subject tracking processing explained with reference to the flowchart shown in FIG. 6, and supplies coordinate information of the subject area to the control unit 35.

At step S312, the coordinate information acquisition unit 331 acquires the coordinate information of the subject area from the subject tracking unit 55, and supplies the coordinate information to the area shape determination unit 332.

At step S313, the area shape determination unit 332 monitors the aspect ratio of the subject area in an input image, for each frame, based on the coordinate information of the subject area supplied from the coordinate information acquisition unit 331, and determines whether or not the aspect ratio of the subject area has changed between the frames significantly with respect to a predetermined threshold value.

When it is determined at step S313 that the aspect ratio of the subject area has not significantly changed with respect to the predetermined threshold value, the processing returns to step S311 and processing from step S311 to step S313 is repeated.

On the other hand, when it is determined at step S313 that the aspect ratio of the subject area has significantly changed with respect to the predetermined threshold value, the area shape determination unit 332 supplies to the imaging control unit 333 information indicating that the aspect ratio of the subject area has significantly changed with respect to the predetermined threshold value.

Figure 16:
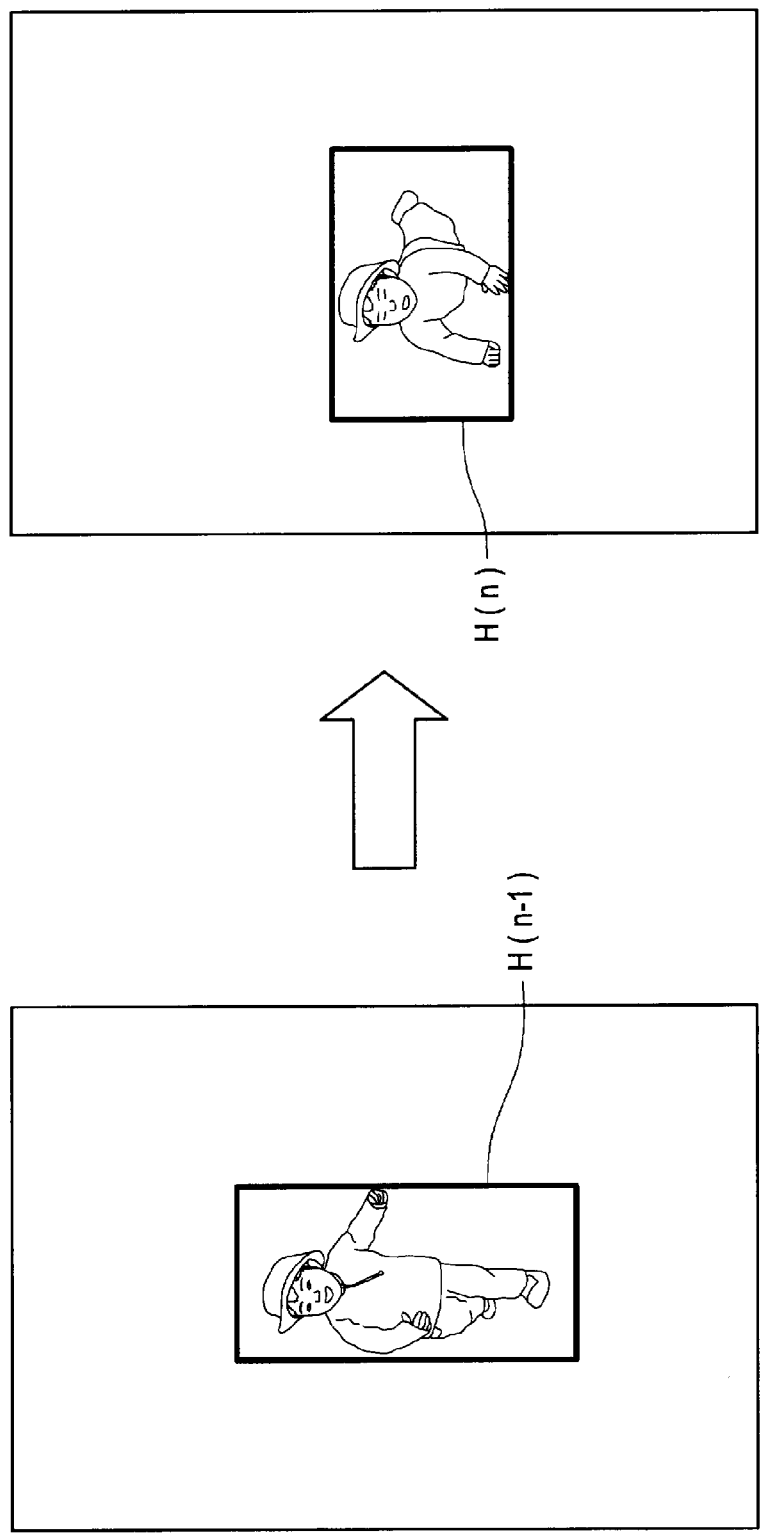
FIG. 16 is a diagram illustrating a change in the aspect ratio of the subject area.

For example, as shown in the left section of FIG. 16, it is assumed that a running child, who is a subject, is in an input image of an (n−1)-th frame. Here, if the height of a subject frame H(n−1), which indicates the subject area in the input image of the (n−1)-th frame, is denoted by Hh(n−1) and the width of the subject frame H(n−1) is denoted by Hw(n−1), an aspect ratio P(n−1) of the subject area is expressed as Hh(n−1)/Hw(n−1).

Then, as shown in the right section of FIG. 16, if the child, who is the subject, has just fallen down in an input image of an n-th frame, an aspect ratio P(n)=Hh(n)/Hw(n) of the subject area in the input image of the n-th frame changes compared to the aspect ratio P(n−1) of the subject area in the input image of the (n−1)-th frame.

At this time, if it is determined by the area shape determination unit 332 that a difference |P(n)−P(n−1)| between the aspect ratio P(n−1) of the subject area in the input image of the (n−1)-th frame and the aspect ratio P(n) of the subject area in the input image of the n-th frame is larger than a predetermined threshold value, information indicating that the aspect ratio of the subject area has significantly changed with respect to the predetermined threshold value is supplied to the imaging control unit 333.

Figure 15:
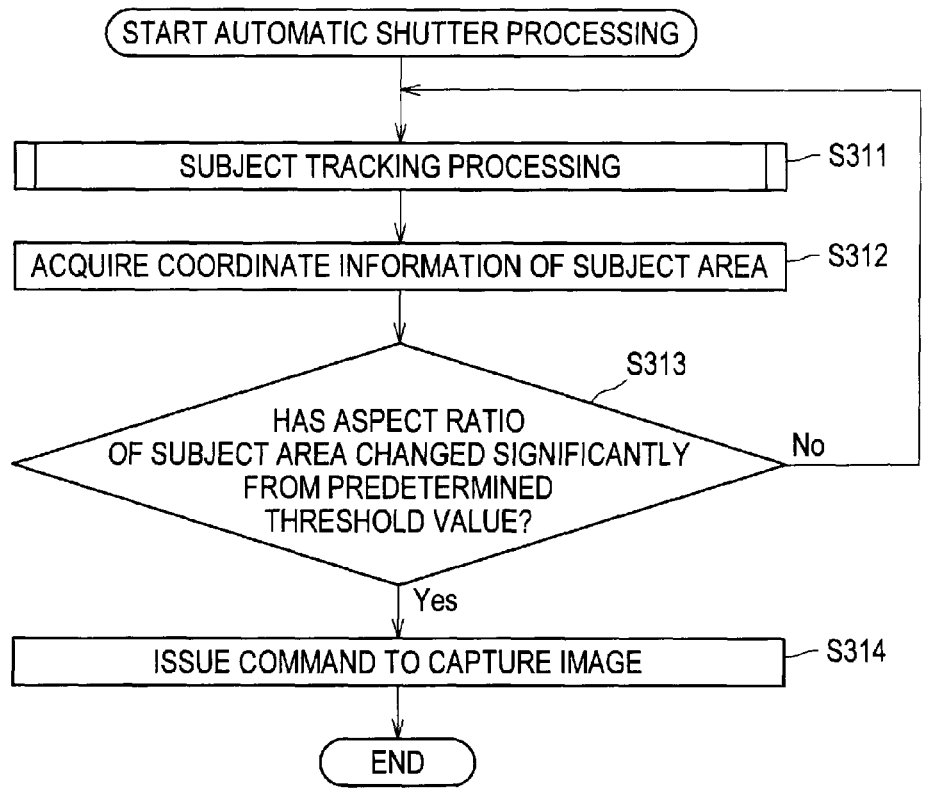
FIG. 15 is a flowchart illustrating automatic shutter processing.

Returning to the flowchart shown in FIG. 15, if the information indicating that the aspect ratio of the subject area has significantly changed with respect to the predetermined threshold value is supplied from the area shape determination unit 332 at step S314, the imaging control unit 333 supplies information indicating an image capture command to the imager 32, the digital signal processing unit 33 and the lens drive unit 36. In response to this, the digital signal processing unit 33 performs predetermined signal processing on image data corresponding to the input image of the n-th frame shown in FIG. 16. The resultant image data is recorded on the recording medium (not shown in the drawings).

With the above-described processing, when the aspect ratio of the subject area including the subject has significantly changed, a still image is captured. Thus, image capture can be performed without missing a decisive moment, such as the moment when the child has just fallen down as explained with reference to FIG. 16. Further, in the subject tracking processing, if a bird is selected as a subject, it is possible to capture an image at a moment when the bird flaps its wings, for example, due to a change in the aspect ratio of the subject frame (the subject area) that surrounds the bird. In this manner, even when the subject is other than a person and does not have a facial expression, it is possible to more reliably obtain a best shot image.

Note that, although in the above description, the aspect ratio of the subject area is expressed by (height of the subject area)/(width of the subject area), it may be expressed as (width of the subject area)/(height of the subject area).

Further, although in the above description, a change in the aspect ratio of the subject area between frames is determined, simply, a change in the height or width of the subject area between frames may be determined.

Although in the above description, a still image is captured when the state of the subject changes, a still image may be captured when the change in the state of the subject stops.

Another Example of Functional Configuration of Control Unit

Given this, an example of a functional configuration of the control unit 35 provided in the image processing apparatus 11 that captures a still image when the change in the state of the subject stops will be explained with reference to FIG. 17.

Figure 17:
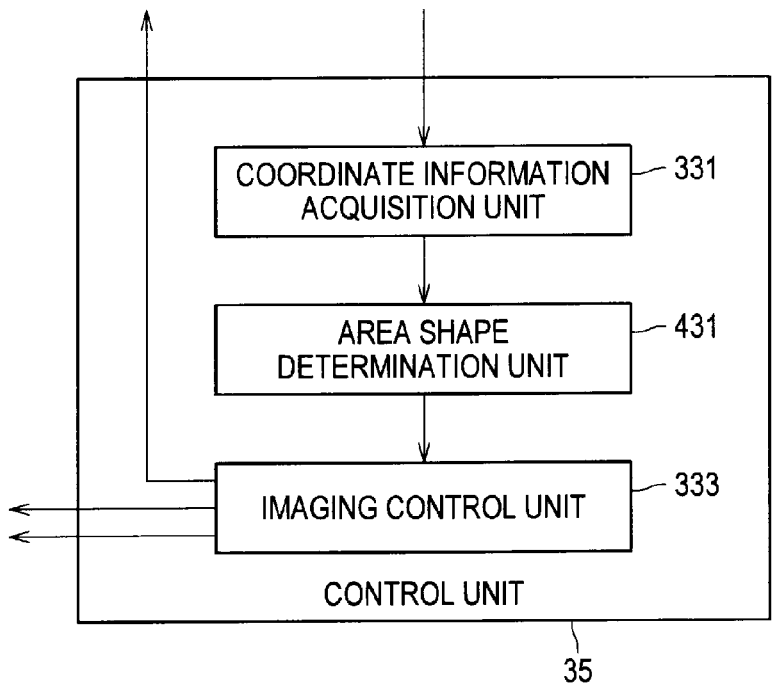
FIG. 17 is a block diagram showing another example of the functional configuration of the control unit.

Note that, in the control unit 35 shown in FIG. 17, structural elements having the same functions as those of the structural elements provided in the control unit 35 shown in FIG. 14 are denoted by the same names and the same reference numerals and an explanation thereof is omitted as appropriate.

More specifically, the control unit 35 shown in FIG. 17 is different from the control unit 35 shown in FIG. 14 in that an area shape determination unit 431 is provided in place of the area shape determination unit 332.

Based on the coordinate information of the subject area supplied from the coordinate information acquisition unit 331, the area shape determination unit 431 determines a change, across a predetermined number of frames, in the aspect ratio of the subject area that is a rectangular area indicated by the coordinate information of the subject area. Then, the area shape determination unit 431 supplies information in accordance with a determination result to the imaging control unit 333.

Automatic Shutter Processing

Next, automatic shutter processing performed by the image processing apparatus 11 provided with the control unit 35 shown in FIG. 17 will be explained with reference to a flowchart shown in FIG. 18.

Figure 18:
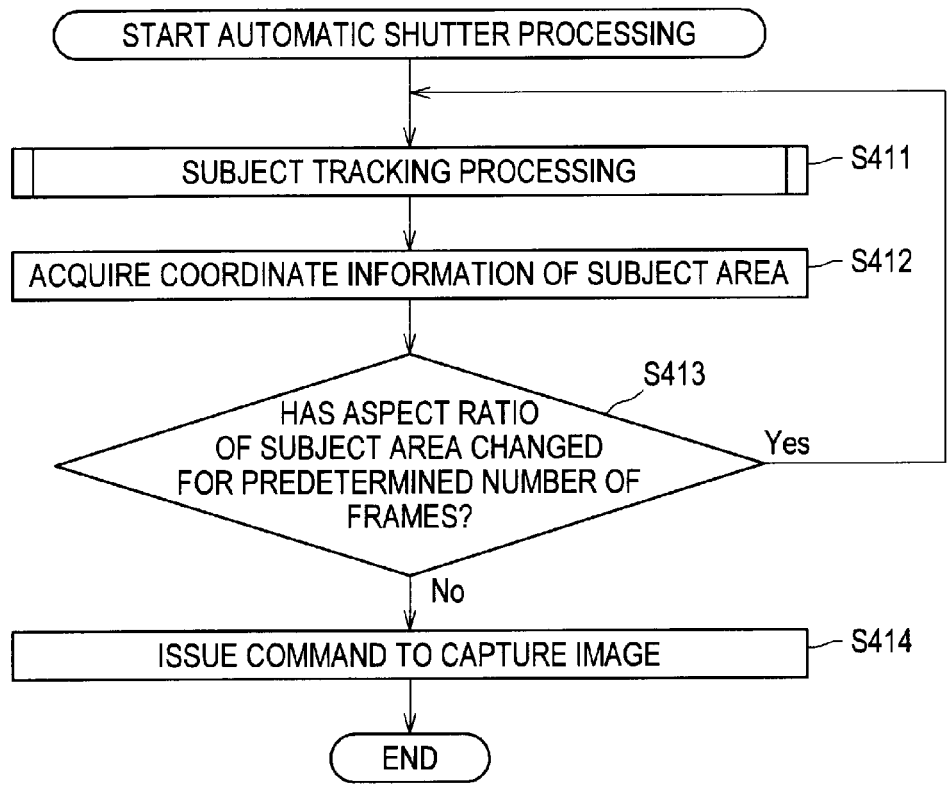
FIG. 18 is a flowchart illustrating automatic shutter processing.

Note that processing at step S411, step S412 and step S414 of the flowchart shown in FIG. 18 is basically the same as the processing at step S311, step S312 and step S314 of the flowchart shown in FIG. 15, and an explanation thereof is therefore omitted.

Specifically, at step S413, based on the coordinate information of the subject area supplied from the coordinate information acquisition unit 331, the area shape determination unit 431 monitors the aspect ratio of the subject area in the input image for each frame, and determines whether or not the aspect ratio of the subject area has changed for a predetermined number of frames.

When it is determined at step S413 that the aspect ratio of the subject area has changed for the predetermined number of frames, the processing returns to step S411 and the processing from step S411 to step S413 is repeated.

On the other hand, when it is determined at step S413 that the aspect ratio of the subject area has not changed for the predetermined number of frames, the area shape determination unit 431 supplies, to the imaging control unit 333, information indicating that the aspect ratio of the subject area has not changed for the predetermined number of frames.

For example, when a variation width of the aspect ratio P(n−q), . . . , p(n) of the subject area is almost not detected for q frames from an (n−q)-th frame to an n-th frame, namely, when the change in the state of the subject has stopped, information indicating that the aspect ratio of the subject area has not changed for the predetermined number of frames is supplied to the imaging control unit 333. In response to this, a command to capture the input image of the n-th frame is issued from the imaging control unit 333.

With the above-described processing, when the aspect ratio of the subject area including the subject has not changed for the predetermined number of frames, a still image is captured. Thus, it is possible to perform image capture without missing a few seconds when the child, who has been moving around and repeatedly standing up and crouching down, stops moving, for example. Further, in the subject tracking processing, when a bird is selected as a subject, it is possible to perform image capture for a few seconds when the bird does not flap its wings in the air. In this manner, even when the subject is other than a person and does not have a facial expression, it is possible to more reliably obtain a best shot image.

In the above description, a still image is captured in response to a change in the state of the subject. However, in this case, the still image is captured regardless of the position of the subject on the input image. Therefore, there are cases in which an image in which the subject is arranged near the end of the image is obtained. There is a high possibility that such an image is not considered to have a good composition.

Yet Another Example of Functional Configuration of Control Unit

Given this, an example of a functional configuration of the control unit 35 provided in the image processing apparatus 11 that captures a still image in response to a position of a subject and a change in the state of the subject will be explained with reference to FIG. 19.

Figure 19:
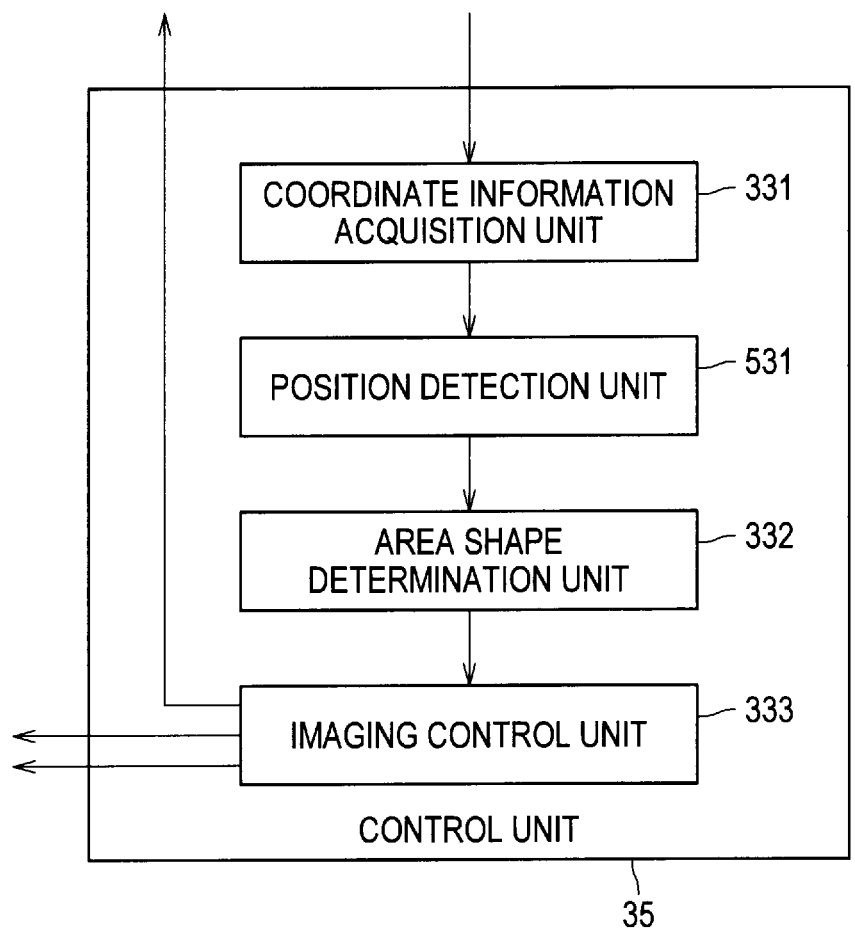
FIG. 19 is a block diagram showing yet another example of the functional configuration of the control unit.

Note that, in the control unit 35 shown in FIG. 19, structural elements having the same functions as those of the structural elements of the control unit 35 shown in FIG. 14 are denoted by the same names and the same reference numerals and an explanation thereof is omitted as appropriate.

More specifically, the control unit 35 shown in FIG. 19 is different from the control unit 35 shown in FIG. 14 in that a position detection unit 531 is additionally provided.

The position detection unit 531 detects the position of the subject in a predetermined frame of the input image, based on the coordinate information of the subject area supplied from the coordinate information acquisition unit 331. In accordance with the detected position, the position detection unit 531 supplies to the area shape determination unit 332 the coordinate information of the subject area that has been supplied from the coordinate information acquisition unit 331.

Automatic Shutter Processing

Next, automatic shutter processing performed by the image processing apparatus 11 provided with the control unit 35 shown in FIG. 19 will be explained with reference to a flowchart shown in FIG. 20.

Figure 20:
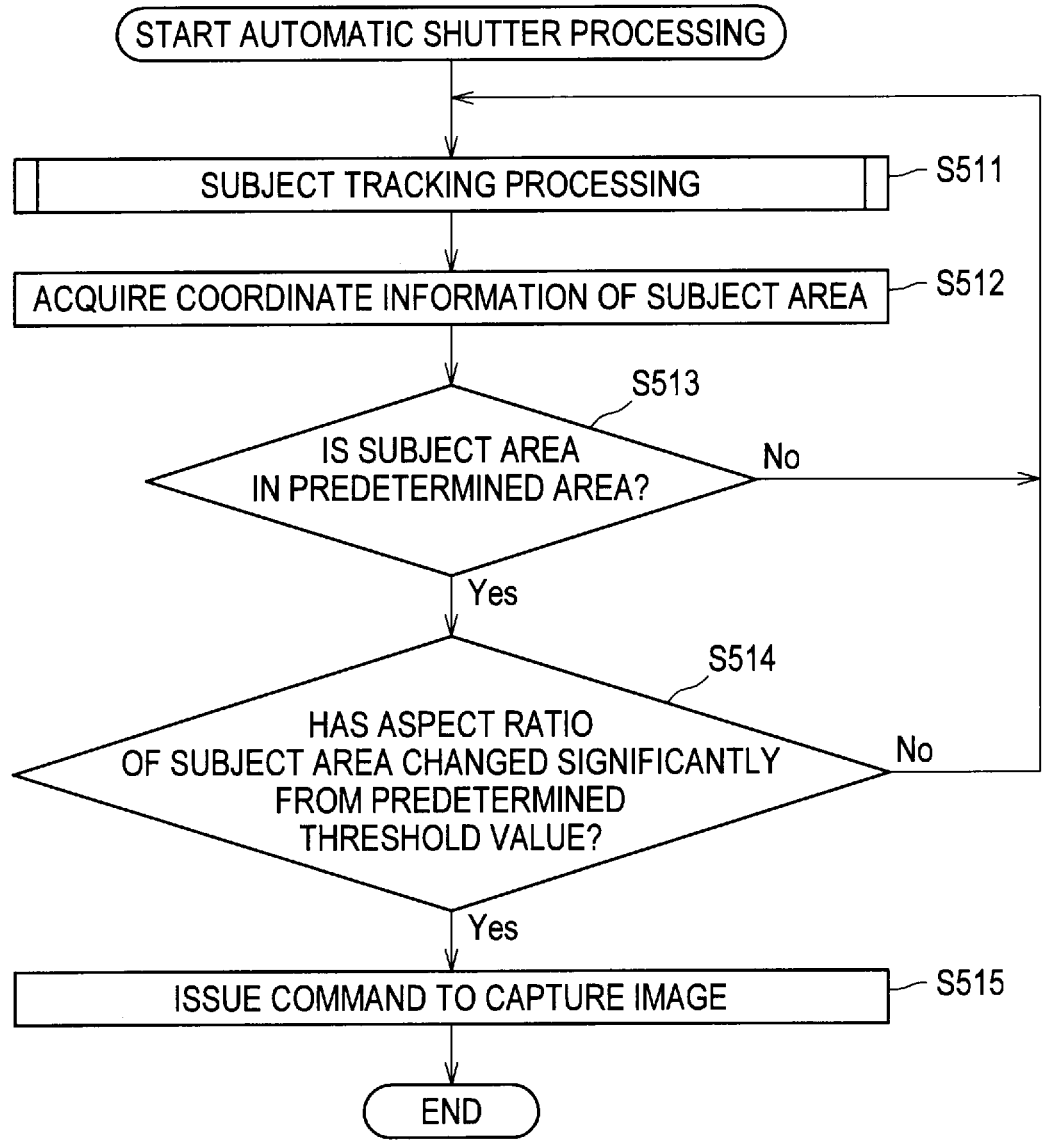
FIG. 20 is a flowchart illustrating automatic shutter processing.

Note that, processing at step S511, step S512, step S514 and step S515 of the flowchart shown in FIG. 20 is basically the same as the processing at step S311 to step S314 of the flowchart shown in FIG. 15, and an explanation thereof is therefore omitted.

Specifically, at step S513, based on the coordinate information of the subject area supplied from the coordinate information acquisition unit 331, the position detection unit 531 monitors the position of the subject area in the input image for each frame, and determines whether or not the position of the subject area is within a predetermined area in the input image. The position of the subject area detected by the position detection unit 531 may be coordinates of all four vertices of the subject area, which is a rectangular area, or may be coordinates of the center position of the subject area. Further, it is assumed that the predetermined area is set in the input image, in the vicinity of the center of the input image.

When it is determined at step S513 that the position of the subject area is not within the predetermined area, the processing returns to step S511, and the processing from step S511 to step S513 is repeated.

On the other hand, when it is determined at step S513 that the position of the subject area is within the predetermined area, the position detection unit 531 supplies, to the area shape determination unit 332, the coordinate information of the subject area supplied from the coordinate information acquisition unit 331.

Figure 21:
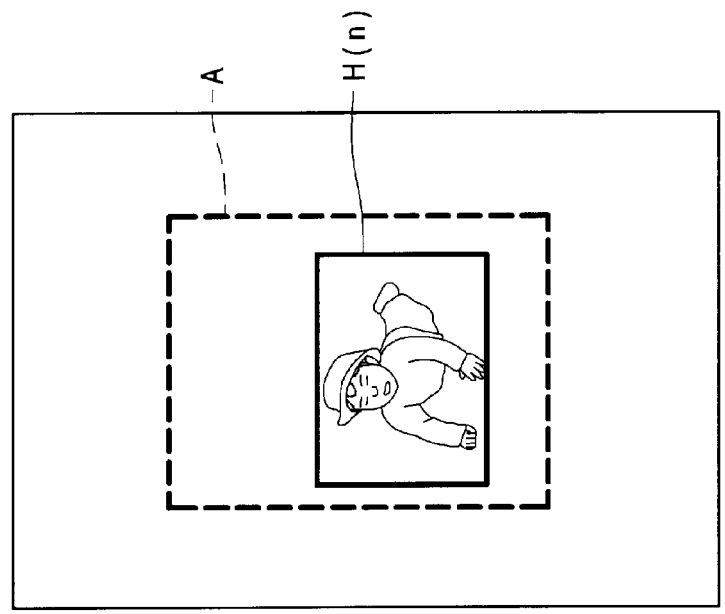
FIG. 21 is a diagram illustrating a change in the aspect ratio of the subject area within a predetermined area.
Figure 21:
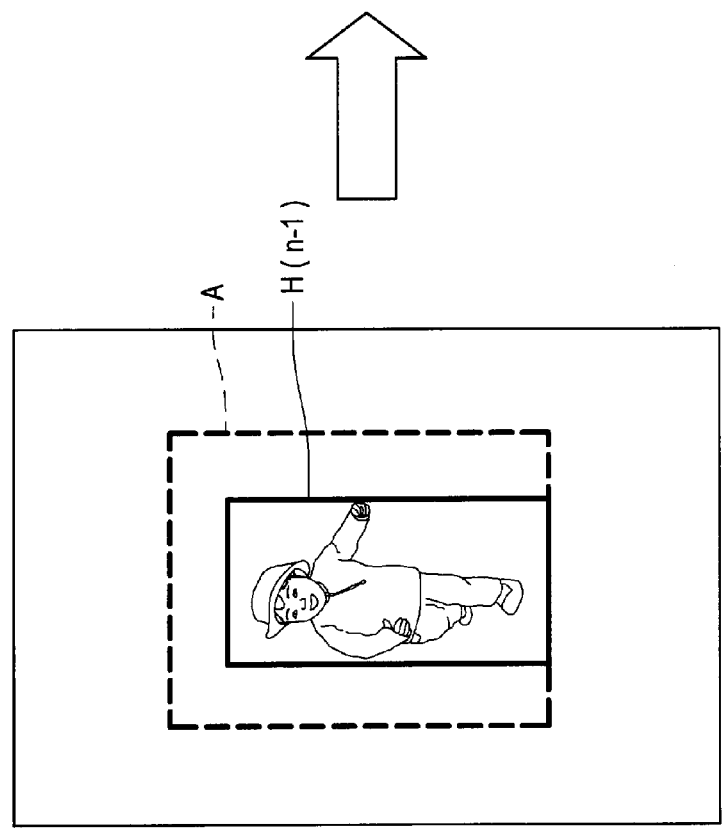

As a result, in a case where the subject area is within an area A shown by a dotted line as shown in FIG. 21, if it is determined by the area shape determination unit 332 that a difference |P(n)−P(n−1)| between the aspect ratio P(n−1) of the subject area in the input image of the (n−1)-th frame and the aspect ratio P(n) of the subject area in the input image of the n-th frame is larger than a predetermined threshold value, information indicating that the aspect ratio of the subject area has significantly changed with respect to the predetermined threshold value is supplied to the imaging control unit 333. In response to this, a command to capture the input image of the n-th frame is issued from the imaging control unit 333.

With the above-described processing, when the aspect ratio of the subject area including the subject has changed significantly in the predetermined area on the input image, a still image is captured. Thus, as shown in FIG. 21, it is possible to capture an image with a better composition without missing a decisive moment, such as the moment when a child has just fallen down, for example. Further, if a bird is selected as a subject in the subject tracking processing, it is possible to capture an image with a better composition at a moment when the bird flaps its wings, for example, due to a change in the aspect ratio of the subject frame (the subject area) that surrounds the bird. In this manner, even when the subject is other than a person and does not have a facial expression, it is possible to more reliably obtain a best shot image with a better composition.

Note that, in the above description, a still image is captured when the state of the subject changes in the predetermined area on the input image. However, if the control unit 35 shown in FIG. 19 is provided with the area shape determination unit 431 shown in FIG. 17 instead of the area shape determination unit 332, it is also possible to capture a still image when the change in the state of the subject stops in the predetermined area on the input image.

Further, although in the above description, it is assumed that the predetermined area is set in the vicinity of the center of the input image, it can also be set by the user at a desired position on the input image. Thus, it is possible to capture an image in a user's desired composition.

In the above description, a still image is captured in accordance with a change in the state of the subject, which is not limited to being a person. When the subject is a person, the face of the person may be detected and a still image of the person may be captured in accordance with a relationship between the whole subject (person) and the face.

Another Example of Configuration of Image Processing Apparatus

Figure 22:
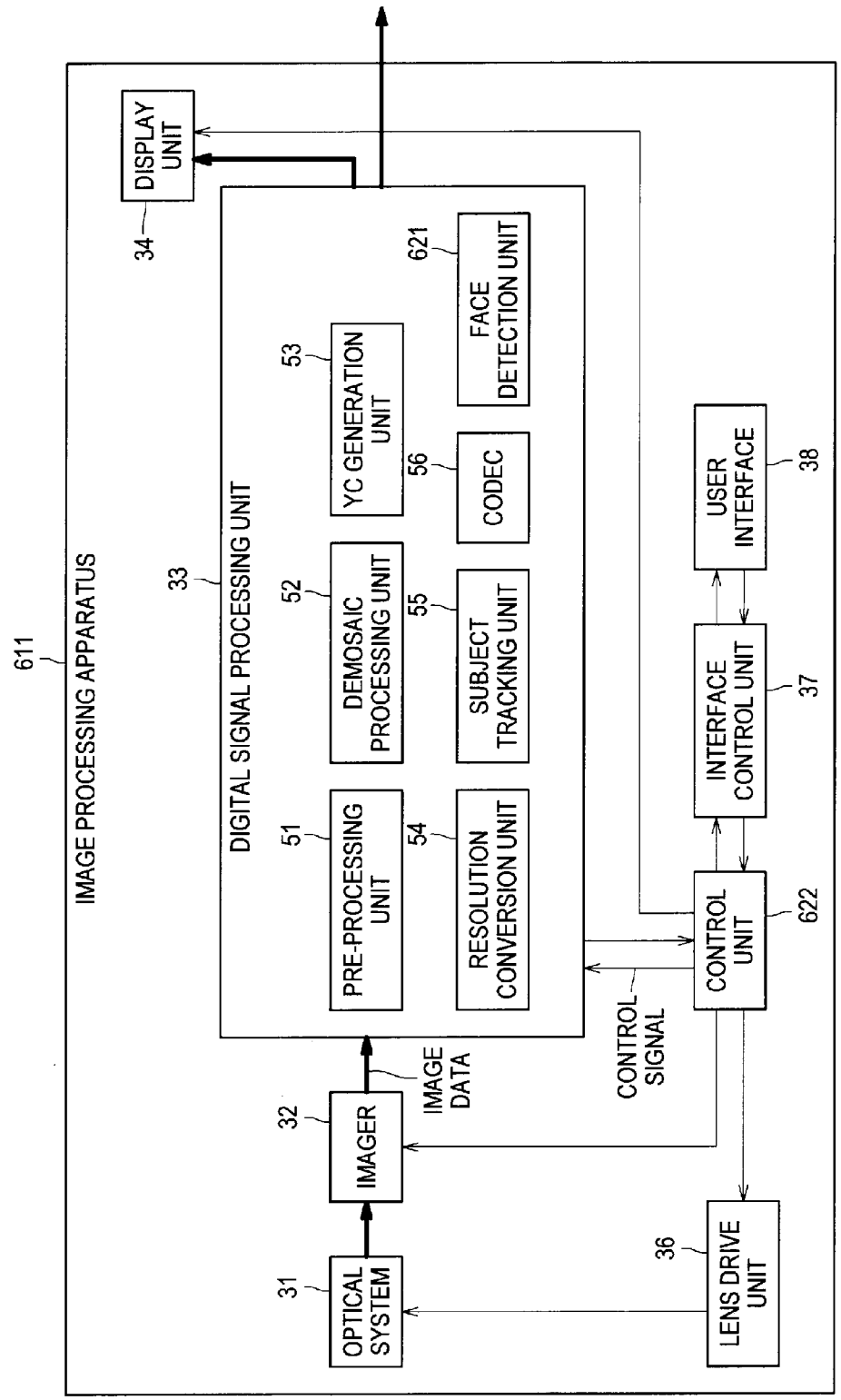
FIG. 22 is a block diagram showing another example of the configuration of the image processing apparatus.

FIG. 22 shows an example of a configuration of an image processing apparatus 611 that detects the face of a person as a subject, and captures a still image in accordance with a relationship between the whole subject (person) and the face.

Note that, in the image processing apparatus 611 shown in FIG. 22, structural elements having the same functions as those of the structural elements provided in the image processing apparatus 11 shown in FIG. 1 are denoted by the same names and the same reference numerals and an explanation thereof is omitted as appropriate.

Specifically, the image processing apparatus 611 shown in FIG. 22 is different from the image processing apparatus 11 shown in FIG. 1 in that a face detection unit 621 is additionally provided in the digital signal processing unit 33, and a control unit 622 is provided instead of the control unit 35.

Based on image data formed of a luminance signal and a color signal generated by the YC generation unit 53, the face detection unit 621 detects a face, in an input image displayed by the image data, from the subject area of the person as a subject detected by the subject tracking unit 55. Then, the face detection unit 621 supplies coordinate information indicating an area of the face (hereinafter referred to as a face area) to the control unit 622.

Based on the subject area supplied from the subject tracking unit 55 and the coordinate information of the face area supplied from the face detection unit 621, the control unit 622 performs automatic shutter processing that captures still images.

Example of Functional Configuration of Control Unit

Here, an example of a functional configuration of the control unit 622 will be explained with reference to FIG. 23.

Figure 23:
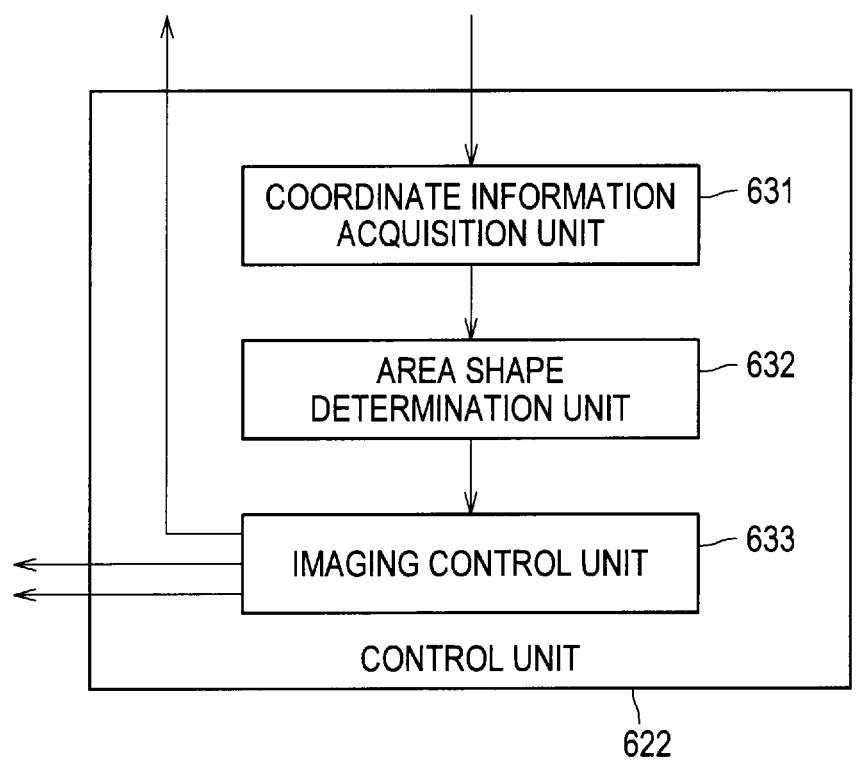
FIG. 23 is a block diagram showing an example of a functional configuration of a control unit shown in FIG. 22.

Note that, an imaging control unit 633 provided in the control unit 622 shown in FIG. 23 has basically the same function as that of the imaging control unit 333 provided in the control unit 35 shown in FIG. 14, and an explanation thereof is therefore omitted.

A coordinate information acquisition unit 631 acquires the coordinate information of the subject area that is supplied from the subject tracking unit 55 for each frame of the input image, and also acquires the coordinate information of the face area that is supplied from the face detection unit 621 for each frame of the input image, and supplies the acquired coordinate information to an area shape determination unit 632.

Based on the coordinate information of the subject area and the face area supplied from the coordinate information acquisition unit 631, the area shape determination unit 632 determines a change in the ratio of the subject area and the face area between frames, and supplies information in accordance with a determination result to the imaging control unit 633.

Automatic Shutter Processing

Next, the automatic shutter processing performed by the image processing apparatus 611 shown in FIG. 22 that is provided with the control unit 622 shown in FIG. 23 will be explained with reference to a flowchart shown in FIG. 24.

Figure 24:
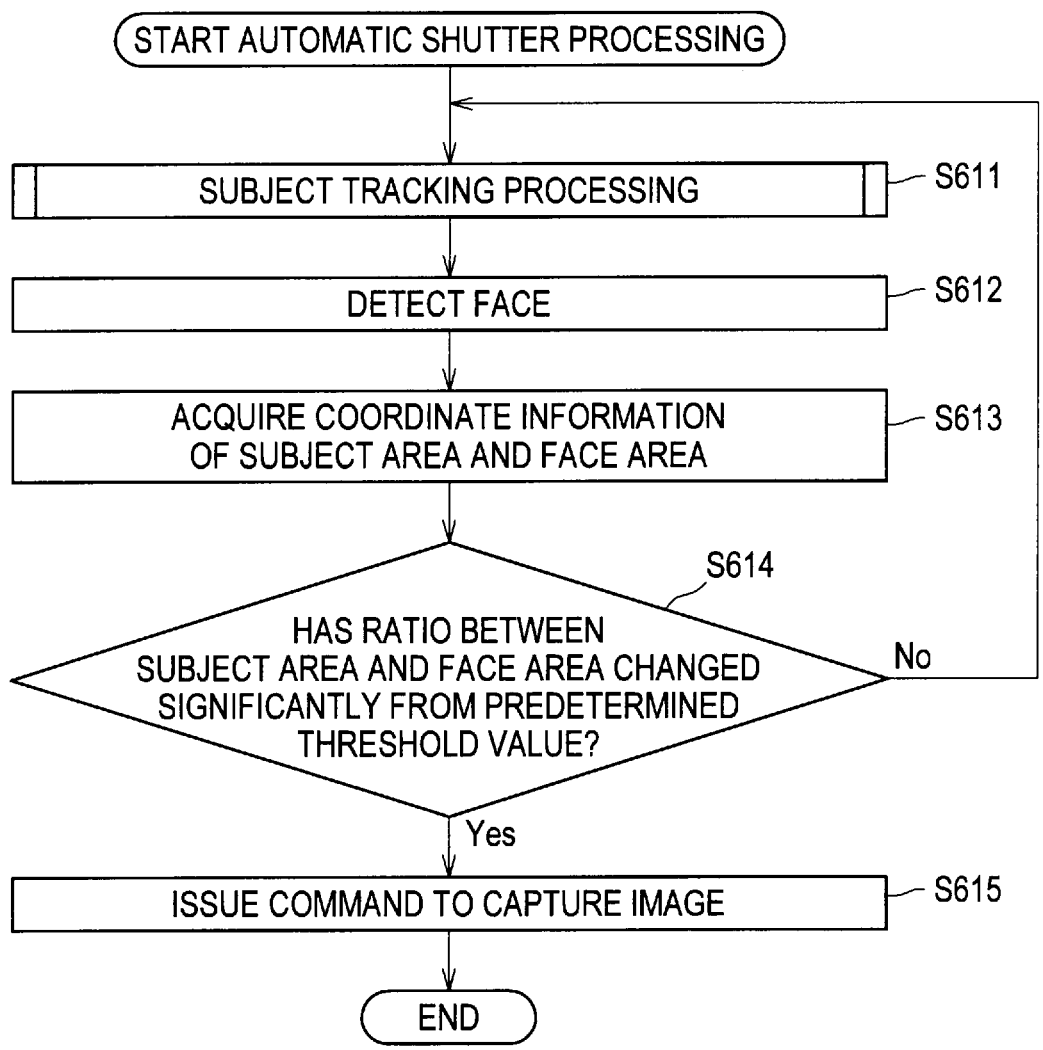
FIG. 24 is a flowchart illustrating automatic shutter processing.

Note that, processing at step S611 and step S615 of the flowchart shown in FIG. 24 is basically the same as the processing at step S311 and step S314 of the flowchart shown in FIG. 15, and an explanation thereof is therefore omitted.

Specifically, at step S612, the face detection unit 621 detects a face in the input image, from the subject area of the person that is the subject detected in the subject tracking processing performed by the subject tracking unit 55. Then, the face detection unit 621 supplies coordinate information indicating the face area to the control unit 622.

At step S613, the coordinate information acquisition unit 631 acquires the coordinate information of the subject area and the coordinate information of the face area respectively supplied from the subject tracking unit 55 and the face detection unit 621, and supplies the acquired coordinate information to the area shape determination unit 632.

At step S614, based on the coordinate information of the subject area and the face area supplied from the coordinate information acquisition unit 631, the area shape determination unit 632 monitors the ratio of the subject area and the face area in the input image for each frame, and determines whether or not the ratio of the subject area and the face area has significantly changed with respect to a predetermined threshold value between the frames.

More specifically, based on the coordinate information of the subject area and the face area supplied from the coordinate information acquisition unit 631, the area shape determination unit 632 determines whether or not a ratio Fh/Hw(where Fh is the height of a face frame F indicating the face area, and Hw is the width of a subject frame H indicating the subject area) has changed significantly between frames with respect to the predetermined threshold value.

When it is determined at step S614 that the ratio of the subject area and the face area has not significantly changed with respect to the predetermined threshold value, the processing returns to step S611, and the processing from step S611 to step S614 is repeated.

On the other hand, when it is determined at step S614 that the ratio of the subject area and the face area has significantly changed with respect to the predetermined threshold value, the area shape determination unit 632 supplies to the imaging control unit 633 information indicating that the ratio of the subject area and the face area has significantly changed with respect to the predetermined threshold value.

Figure 25:
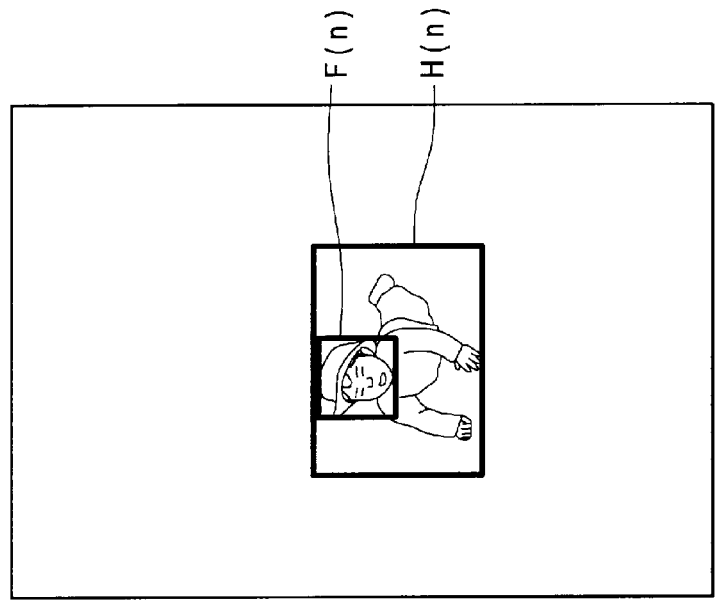
FIG. 25 is a diagram illustrating a change in the ratio of the subject area and the face area.
Figure 25:
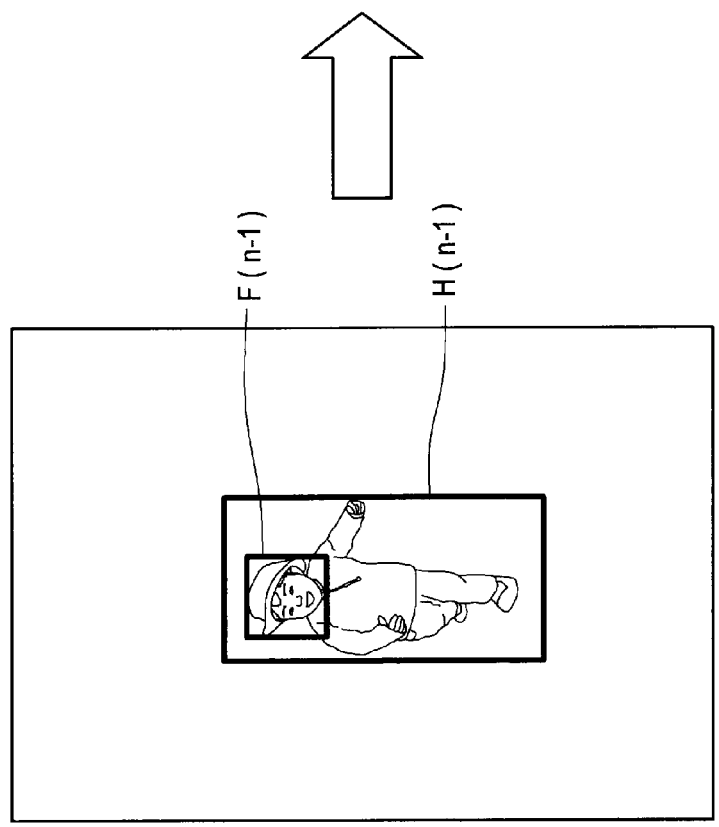

For example, as shown on the left side of FIG. 25, when a running child, who is a subject, is in the input image of the (n−1)-th frame, a ratio Q(n−1) of the subject area and the face area is expressed as Fh(n−1)/Hw(n−1), where Fh(n−1) is the height of a face frame F(n−1) indicating the face area, and Hw(n−1) is the width of a subject frame H(n−1) indicating the subject area.

Then, as shown on the right side of FIG. 25, if the child, who is the subject, has just fallen down in the input image of the n-th frame, Q(n)=Fh(n)/Hw(n), which is the ratio of the subject area and the face area in the input image of the n-th frame, has changed compared to the ratio Q(n−1) of the subject area and the face area in the input image of the (n−1)-th frame.

At this time, if it is determined by the area shape determination unit 632 that a difference |Q(n)−Q(n−1)| between the ratio Q(n−1) of the subject area and the face area in the input image of the (n−1)-th frame and the ratio Q(n) of the subject area and the face area in the input image of the n-th frame is larger than a predetermined threshold value, information indicating that the ratio of the subject area and the face area has significantly changed with respect to the predetermined threshold value is supplied to the imaging control unit 633. In response to this, a command to capture the input image of the n-th frame is issued from the imaging control unit 633.

With the above-described processing, a still image is captured when the ratio of the subject area and the face area has changed significantly. As a result, it is possible to perform image capture without missing a decisive moment, such as the moment when the child has just fallen down as shown in FIG. 25, and it is therefore possible to more reliably obtain a best shot image.

Note that, if the control unit 622 shown in FIG. 23 further includes the position detection unit 531 shown in FIG. 19 at a later stage of the coordinate information acquisition unit 631, it is also possible to capture a still image when the ratio of the subject area and the face area has changed significantly in a predetermined area of the input image.

Further, in the above description, a still image is captured when the ratio of the subject area of the subject, which is a person, and the face area of the face, which is a part of the person, has changed. However, if a subject and a part of the subject can be respectively detected, it is possible to capture an image of a subject other than a person, in response to a change in the ratio of the respective areas Although in the above description, a still image is captured when the ratio of the subject area and the face area has changed, a still image may be captured when the ratio of the subject area and the face area reaches a value determined in advance.

Another Example of Functional Configuration of Control Unit

Given this, an example of a functional configuration of the control unit 622 provided in the image processing apparatus 611 that captures a still image when the ratio of the subject area and the face area reaches a value determined in advance will be explained with reference to FIG. 26.

Figure 26:
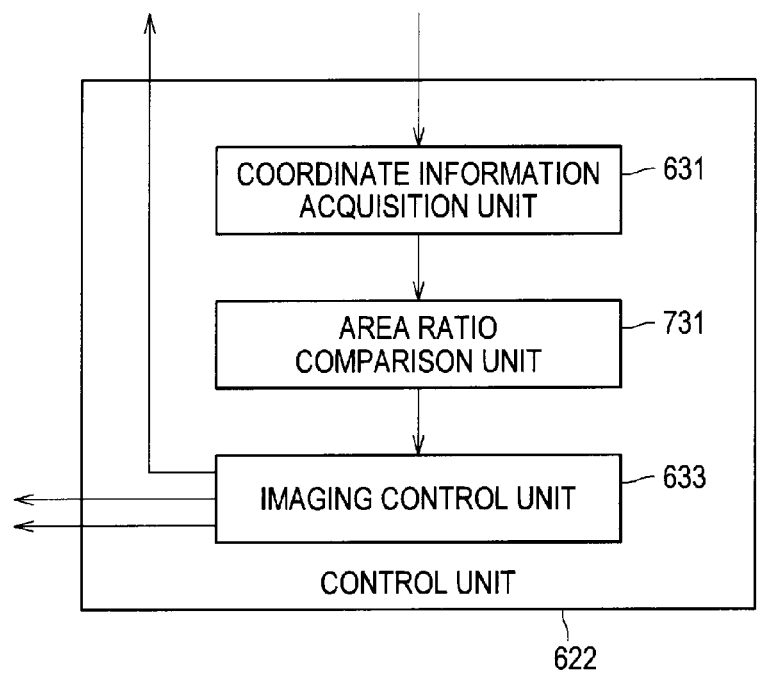
FIG. 26 is a block diagram showing another example of the functional configuration of the control unit.

Note that, in the control unit 622 shown in FIG. 26, structural elements having the same functions as those of the structural elements provided in the control unit 622 shown in FIG. 23 are denoted by the same names and the same reference numerals and an explanation thereof is omitted as appropriate.

More specifically, the control unit 622 shown in FIG. 26 is different from the control unit 622 shown in FIG. 23 in that an area ratio comparison unit 731 is provided instead of the area shape determination unit 632.

Based on the coordinate information of the subject area and the face area supplied from the coordinate information acquisition unit 631, the area ratio comparison unit 731 compares the ratio of the subject area and the face area in a predetermined frame of the input image with a target value determined in advance, and supplies information in accordance with a comparison result to the imaging control unit 633. Note that the target value can be set by the user as desired.

Automatic Shutter Processing

Next, automatic shutter processing performed by the image processing apparatus 611 shown in FIG. 22 provided with the control unit 622 shown in FIG. 26 will be explained with reference to a flowchart shown in FIG. 27.

Figure 27:
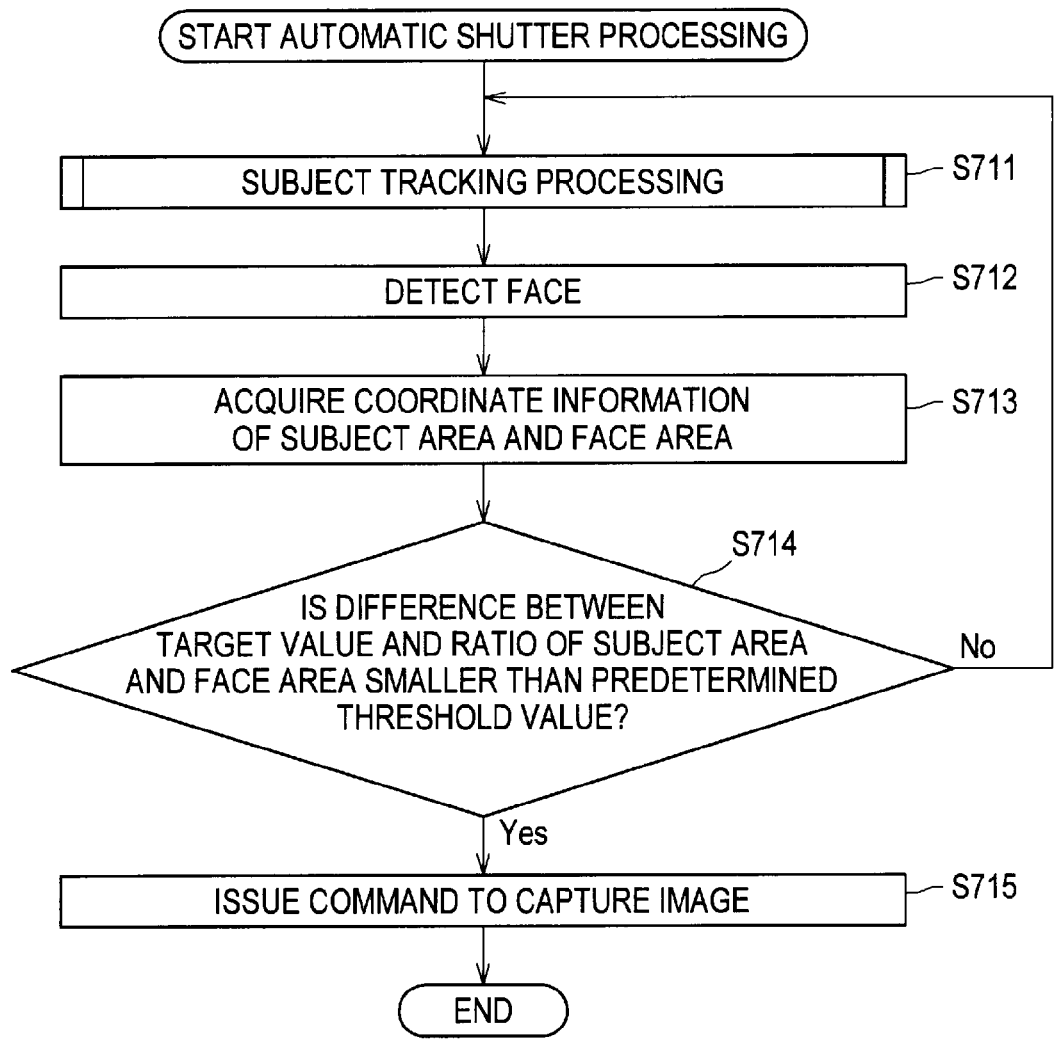
FIG. 27 is a flowchart illustrating automatic shutter processing.

Note that, processing at step S711 to step S713 and step S715 of the flowchart shown in FIG. 27 is basically the same as the processing at step S611 to step S613 and step S615 of the flowchart shown in FIG. 24, and an explanation thereof is therefore omitted.

Specifically, at step S714, based on the coordinate information of the subject area and the face area supplied from the coordinate information acquisition unit 631, the area ratio comparison unit 731 compares the ratio of the subject area and the face area in a predetermined frame of the input image with the target value determined in advance.

More specifically, based on the coordinate information of the subject area and the face area, the area ratio comparison unit 731 determines whether or not a difference between the target value and the ratio of the subject area and the face area is smaller than a predetermined threshold value.

When it is determined at step S714 that the difference between the target value and the ratio of the subject area and the face area is not smaller than the predetermined threshold value, the processing returns to step S711 and the processing from step S711 to step S714 is repeated.

On the other hand, when it is determined at step S714 that the difference between the target value and the ratio of the subject area and the face area is smaller than the predetermined threshold value, namely, when the ratio of the subject area and the face area is the same as the target value or substantially the same as the target value, the area ratio comparison unit 731 supplies, to the imaging control unit 633, information indicating that the difference between the target value and the ratio of the subject area and the face area is smaller than the predetermined threshold value.

Figure 28:
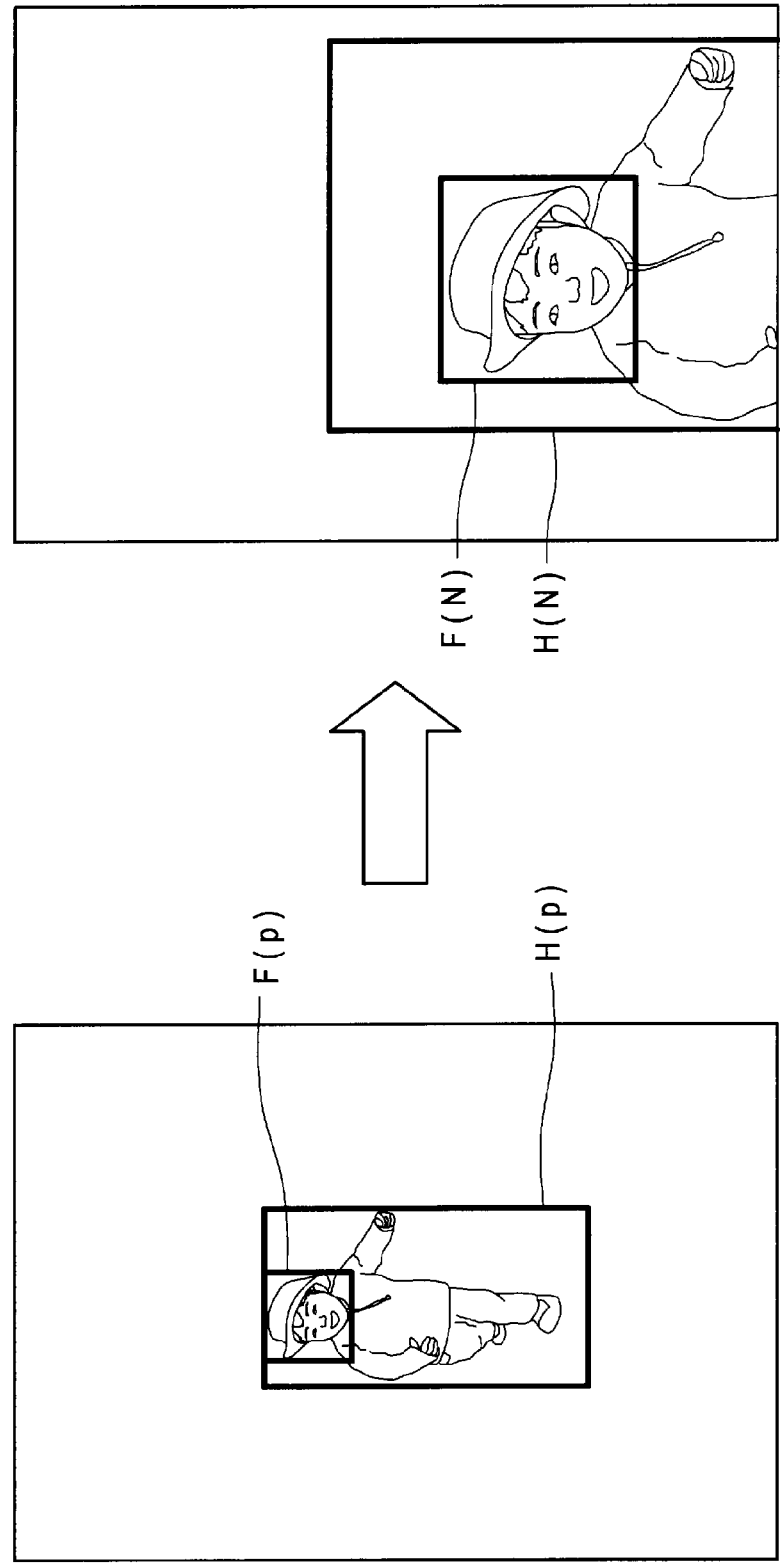
FIG. 28 is a diagram illustrating a change in the ratio of the subject area and the face area.

For example, as shown on the left side of FIG. 28, it is assumed that a child as a subject is running from further back and coming closer to the image processing apparatus 611 in the input image of a p-th frame. Here, a ratio S(p) of the subject area and the face area is expressed as Hh(p)/Fh(p), where Hh(p) is the height of a subject frame H(p) indicating the subject area in the input image of the p-th frame, and Fh(p) is the height of a face frame F(p) indicating the face area.

Then, as shown on the right side of FIG. 28, when the child as the subject moves in proximity to the image processing apparatus 611 and it is determined, in the input image of an N-th frame, that the difference between the target value and a ratio S(N)=Hh(N)/Fh(N) of the subject area and the face area is smaller than a predetermined threshold value, information indicating that the difference between the target value and the ratio of the subject area and the face area is smaller than the predetermined threshold value is supplied to the imaging control unit 633. In response to this, a command to capture the input image of the N-th frame is issued from the imaging control unit 633.

With the above-described processing, a still image is captured when the difference between the target value and the ratio of the subject area and the face area is smaller than the predetermined threshold value. As a result, it is possible to capture the moment when the child comes closer and the person's size (a so-called shot) in the imaging range becomes a best shot to capture an image of the upper half of the body, as shown in FIG. 28. Thus, it is possible to more reliably obtain a best shot image.

Further, by adjusting the target value, it is possible to capture a still image at a user's desired shot, such as a full shot that captures the whole subject, a close-up shot that captures the face, and the like.

In the above description, the processing performed when the image processing apparatus is formed as a digital still camera that captures still images is explained. When the image processing apparatus is formed as a digital video camera that captures video, it is possible to cause the image processing apparatus to perform frame identification processing, as an example of an application to which a tracking result of the subject tracking processing is applied. The frame identification processing identifies a predetermined frame in video in response to a change in a state of a tracked subject.

Yet Another Example of Image Processing Apparatus

Next, an example of a configuration of an image processing apparatus 811 that performs the frame identification processing will be explained with reference to FIG. 29. The frame identification processing identifies a predetermined frame in video, in response to a change in a state of the subject tracked by the above-described subject tracking processing.

Figure 29:
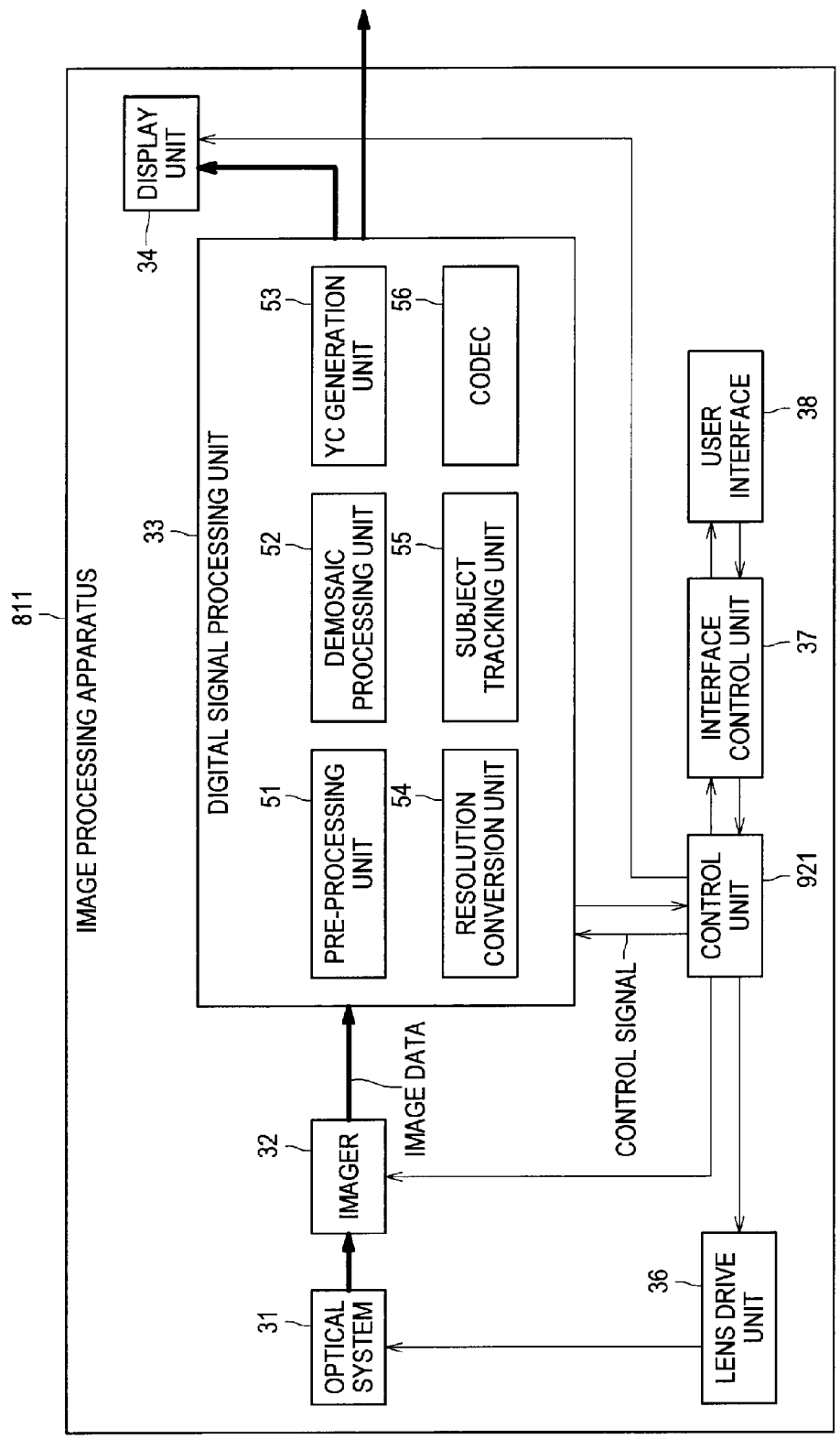
FIG. 29 is a block diagram showing yet another example of the configuration of the image processing apparatus.

Note that, in the image processing apparatus 811 shown in FIG. 29, structural elements having the same functions as those of the structural elements provided in the image processing apparatus 11 shown in FIG. 1 are denoted by the same names and the same reference numerals and an explanation thereof is omitted as appropriate.

Specifically, the image processing apparatus 811 shown in FIG. 29 is different from the image processing apparatus 11 shown in FIG. 1 in that a control unit 821 is provided instead of the control unit 35.

The control unit 821 performs the frame identification processing that identifies a predetermined frame in video, based on the coordinate information of the subject area supplied from the subject tracking unit 55.

Example of Functional Configuration of Control Unit

Here, an example of a functional configuration of the control unit 821 will be explained with reference to FIG. 30.

Figure 30:
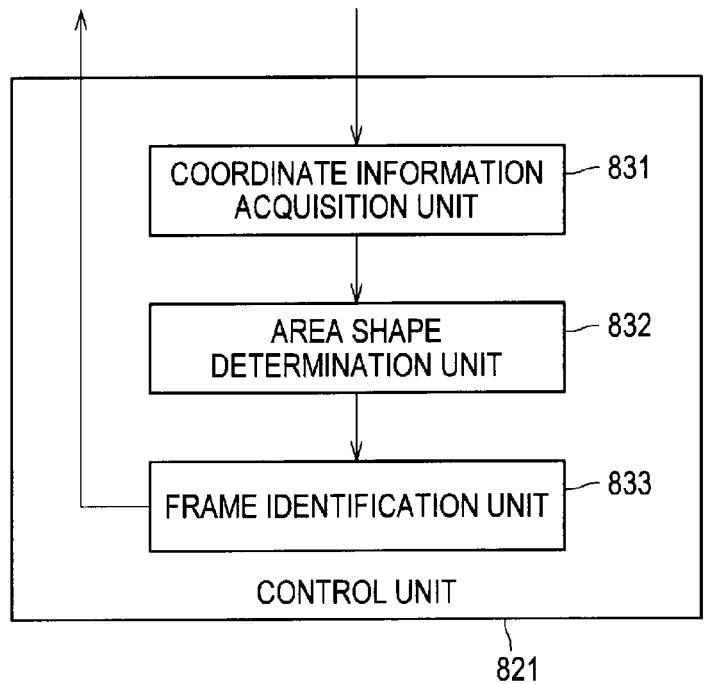
FIG. 30 is a block diagram showing an example of a functional configuration of a control unit shown in FIG. 29.

Note that, in the control unit 821 shown in FIG. 30, a coordinate information acquisition unit 831 and an area shape determination unit 832 have basically the same functions as those of the coordinate information acquisition unit 331 and the area shape determination unit 332 provided in the control unit 35 shown in FIG. 14, and an explanation thereof is therefore omitted.

Based on information from the area shape determination unit 832, a frame identification unit 833 controls the digital signal processing unit 33 such that signal processing is performed in the digital signal processing unit 33 and a predetermined frame of the input image to be recorded on the recording medium (not shown in the drawings) is identified.

Frame Identification Processing

Next, the frame identification processing performed by the image processing apparatus 811 shown in FIG. 29, which includes the control unit 821 shown in FIG. 30, will be explained with reference to a flowchart shown in FIG. 31.

Figure 31:
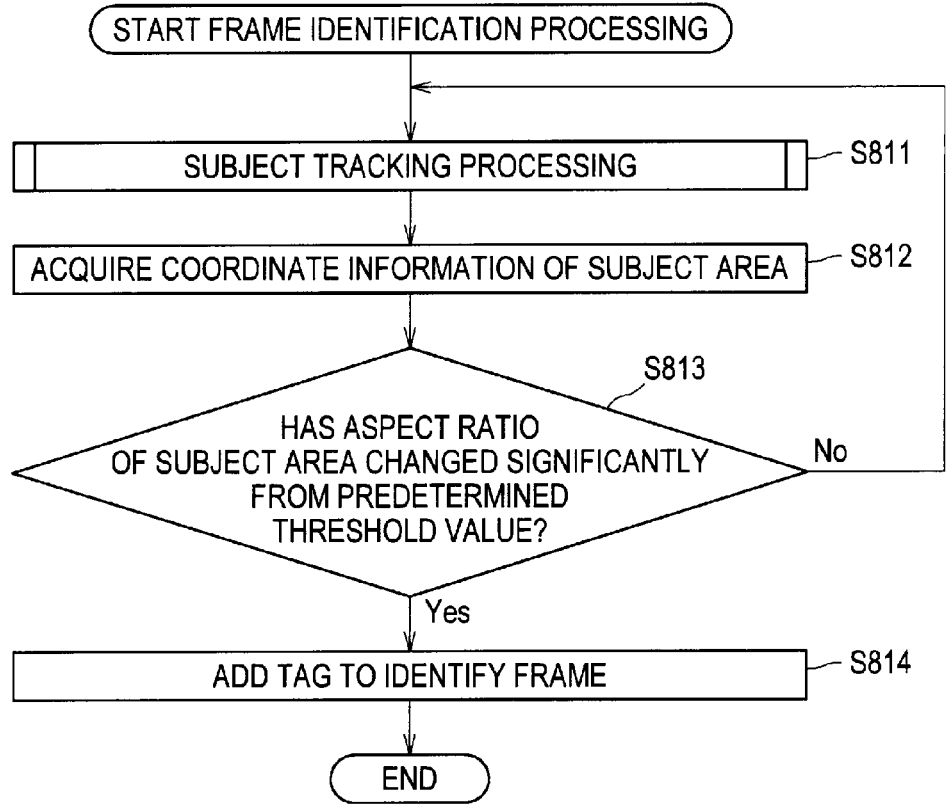
FIG. 31 is a flowchart illustrating frame identification processing.

Note that, processing at step S811 to step S813 of the flowchart shown in FIG. 31 is basically the same as the processing at step S311 to step S313 of the flowchart shown in FIG. 15, and an explanation thereof is therefore omitted.

Specifically, if information indicating that the aspect ratio of the subject area has changed significantly with respect to a predetermined threshold value is supplied from the area shape determination unit 832, the frame identification unit 833 controls the digital signal processing unit 33 at step S814 such that a tag to identify a predetermined frame is added to an input image. As a result, video, to which the tag to identify the predetermined frame is added as metadata, is recorded on the recording medium (not shown in the drawings).

With the above-described processing, when the aspect ratio of the subject area including a subject has changed significantly, the tag is added to identify the frame in the video. Thus, in a case where the recorded video is edited, for example, it is possible to easily retrieve a decisive moment, such as the moment when a child has just fallen down.

Note that, in the above description, a frame is identified in video when the aspect ratio of the subject area has changed significantly. However, if the control unit 821 shown in FIG. 30 is provided with the area shape determination unit 431 shown in FIG. 17 in place of the area shape determination unit 832, it is also possible to identify a frame in video when the change in the state of the subject has stopped in a predetermined area on the input image.

Further, if the control unit 821 shown in FIG. 30 further includes the position detection unit 531 shown in FIG. 19 at a later stage of the coordinate information acquisition unit 831, it is also possible to identify a frame in video when the state of the subject has changed in a predetermined area on the input image.

Furthermore, if the digital signal processing unit 33 of the image processing apparatus 811 further includes the face detection unit 621 shown in FIG. 22 and the control unit 821 shown in FIG. 30 includes the area shape determination unit 632 shown in FIG. 23 in place of the area shape determination unit 832, it is also possible to identify a frame in video when the ratio of the subject area and the face area has changed significantly.

Moreover, when the ratio of the subject area and the face area has changed significantly, the frame identification unit 833 may issue to the digital signal processing unit 33 a command to start or stop recording of the video on the recording medium (not shown in the drawings).

The above-described series of processing may be performed by hardware or may be performed by software. When the series of processing is performed by software, a program that forms the software is installed in a computer incorporated into a dedicated hardware, or the program is installed from a program storage medium to a general personal computer, for example, that can perform various types of functions by installing various types of programs.

Figure 32:
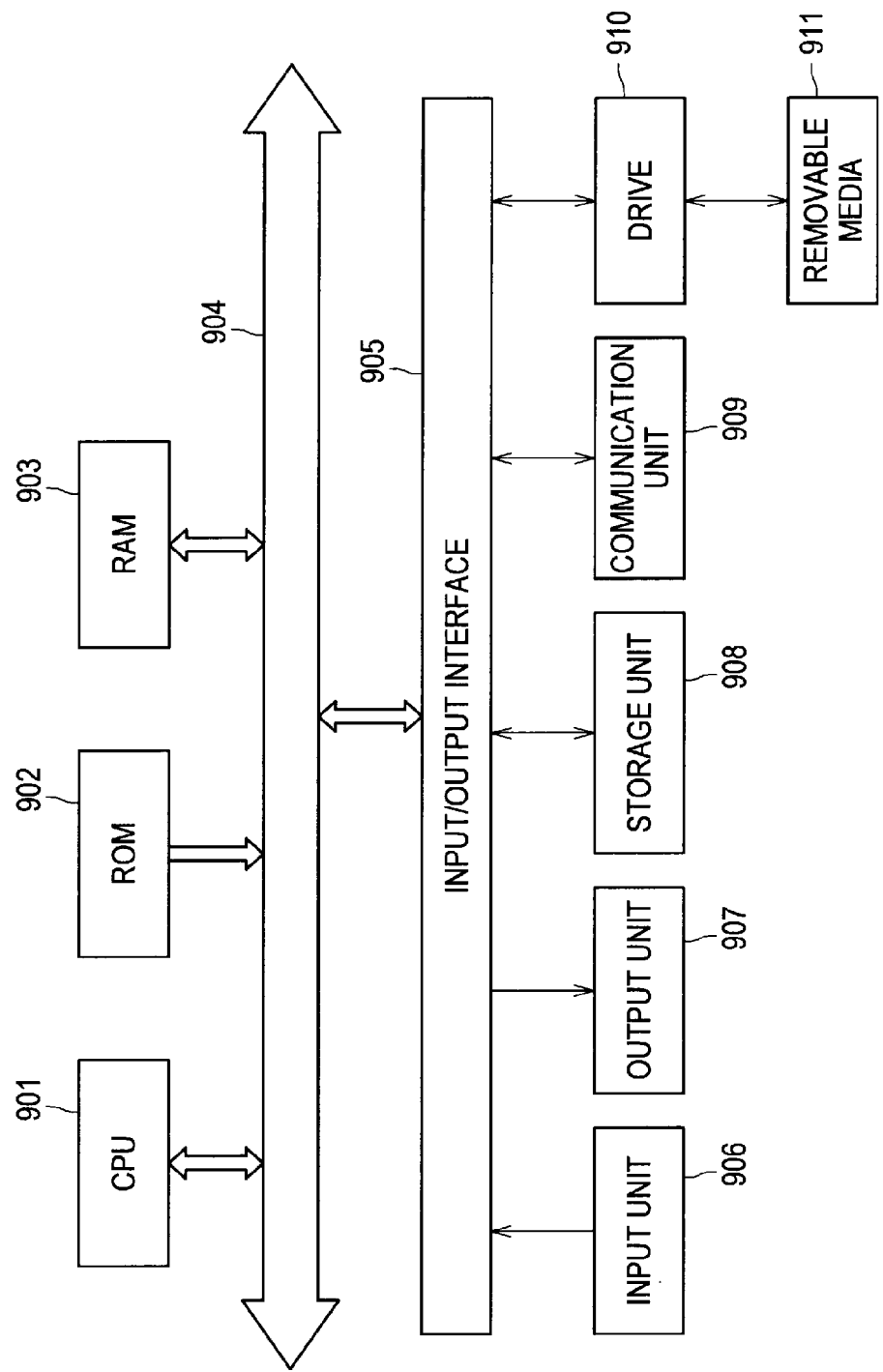
FIG. 32 is a block diagram showing an example of a hardware configuration of a computer.

FIG. 32 is a block diagram showing an example of a hardware configuration of a computer that performs the above-described series of processing in accordance with a program.

In the computer, a central processing unit (CPU) 901, a read only memory (ROM) 902 and a random access memory (RAM) 903 are mutually connected by a bus 904.

Further, an input/output interface 905 is connected to the bus 904. An input unit 906, an output unit 907, a storage unit 908, a communication unit 909, and a drive 910 that drives a removable media 911 are connected to the input/output interface 905. The input unit 906 includes a keyboard, a mouse, a microphone and the like. The output unit 907 includes a display, a speaker and the like. The storage unit 908 includes a hard disk, a nonvolatile memory and the like. The communication unit 909 includes a network interface and the like. The removable media 911 is a magnetic disk, an optical disk, a magneto optical disk, a semiconductor memory or the like.

In the computer configured as described above, the above-described series of processing is performed such that the CPU 901 loads a program stored in, for example, the storage unit 908 into the RAM 903 via the input/output interface 905 and the bus 904, and executes the program.

The program executed by the computer (the CPU 901) is provided by recording it in, for example, a magnetic disk (including a flexible disk), an optical disk (a compact disc-read only memory (CD-ROM), a digital versatile disc (DVD) or the like), a magneto optical disk, or the removable media 911 that is a package media formed by a semiconductor memory etc. Alternatively, the above program is provided via a wired or wireless transmission medium, such as a local area network, the Internet and digital satellite broadcasting.

The program can be installed in the storage unit 908 via the input/output interface 905, by attaching the removable media 911 to the drive 910. Further, the program can be received by the communication unit 909 via a wired or wireless transmission medium and can be installed in the storage unit 908. Furthermore, the program can be installed in advance in the ROM 902 or the storage unit 908.

Note that the program executed by the computer may be a program in which processing is performed in time series in line with the order explained in this specification, or may be a program in which processing is performed at a necessary timing, such as when a call is performed.

The embodiment of the present invention is not limited to the embodiment described above, and various modifications may occur insofar as they fall within the spirit and scope of the present invention.

REFERENCE SIGNS LIST

11 Image processing apparatus
34 Display unit
35 Control unit
55 Subject tracking unit
71 Subject map generation unit
72 Subject candidate area rectangular forming unit
73 Subject area selection unit
74 Weighting factor calculation unit
111 Saliency map generation unit
112 Band saliency map generation unit
113 Band saliency map synthesis unit
114 Synthesized saliency map synthesis unit
131 Binarization processing unit
132 Labeling processing unit
133 Rectangular area coordinate calculation unit
134 Area information calculation unit
151 Area information comparison unit
152 Subject area decision unit
200 Input image
201 Subject map
221, 222 Rectangular area
231 Subject frame
332 Area shape determination unit
333 Imaging control unit
431 Area shape determination unit
531 Position detection unit
632 Area shape determination unit
633 Imaging control unit
731 Area ratio comparison unit
832 Area shape determination unit
833 Frame identification unit

The invention claimed is:

1. An image processing apparatus comprising:
a shutter; and
circuitry configured to
determine a first frame border positioned within a first image and a second frame border positioned within a second image, the first image and the second image being sequential images in time;
determine aspect ratios of the first frame border and the second frame border;
compare the aspect ratios of the first frame border and the second frame border in order to detect a change in aspect ratio between the first frame border and the second frame border; and
actuate the shutter and capture an image with an image sensor in response to a detection of the change in aspect ratio between the first frame border and the second frame border.

2. The image processing apparatus of claim 1, wherein:
said change between the first frame border and the second frame border occurs in response to one of a movement of a subject within the first frame border and second frame, and a feature change of said subject.

3. The image processing apparatus of claim 1, wherein:

said first image and said second image are images within a video.

4. The image processing apparatus of claim 3, wherein:

said video including images captured in a viewfinder of at least one of a digital still camera and a digital video recorder; and said first frame border and said second frame border being visible within said viewfinder.

5. The image processing apparatus of claim 1, wherein:

said circuitry is configured to actuate said shutter after a predetermined period of time in which said shutter is inactive.

6. The image processing apparatus of claim 1, wherein:

said circuitry is configured to determine a first smaller frame positioned within said first frame border, and a second smaller frame within said second frame border, and said change between the first frame border and second frame border is detected when a ratio of areas of the first smaller frame to first frame border and a ratio of areas of the second smaller frame to second frame border satisfies a predetermined criteria.

7. The image processing apparatus according to claim 1, wherein the circuitry automatically actuates the shutter and captures the image solely in response to the detection of the change in aspect ratio between the first frame border and the second frame border.

8. An image processing method comprising:

determining with a processor a first frame border positioned within a first image and a second frame border positioned within a second image, the first image and the second image being sequential images in time;

determining aspect ratios of the first frame border and the second frame border;

comparing the aspect ratios of the first frame border and the second frame border in order to detect a change in aspect ratio between the first frame border and the second frame border; and actuating a shutter and capturing an image with an image sensor in response to a detection of the change in aspect ratio between the first frame border and the second frame border.

9. The method of claim 8, wherein:

said change between the first frame border and the second frame border occurs in response to one of a movement of a subject within the first frame border and second frame border, and a feature change of said subject.

10. The method of claim 8, wherein:

said first image and said second image are images within a video.

11. The method of claim 10, further comprising:

capturing said images in a viewfinder of at least one of a digital still camera and a digital video recorder; and presenting said first frame border and said second frame border within said viewfinder.

12. The method of claim 8, wherein:

said actuating includes actuating said shutter after a predetermined period of time in which said shutter is inactive.

13. The method of claim 8, further comprising:

determining a first smaller frame positioned within said first frame border, and a second smaller frame within said second frame border, wherein said detecting includes detecting a change between the first frame border and second frame border when a ratio of areas of the first smaller frame to first frame border and a ratio of areas of the second smaller frame to second frame border satisfies a predetermined criteria.

14. The image processing method according to claim 8, wherein the actuating includes automatically actuating the shutter and capturing the image solely in response to the detection of the change in aspect ratio between the first frame border and the second frame border.

15. A non-transitory computer readable storage device having instructions that when executed by a processor perform a method comprising:

determining with a processor a first frame border positioned within a first image and a second frame border positioned within a second image, the first image and the second image being sequential images in time;

determining aspect ratios of the first frame border and the second frame border;

comparing the aspect ratios of the first frame border and the second frame border in order to detect a change in aspect ratio between the first frame border and the second frame border; and actuating a shutter and capturing an image with an image sensor in response to a detection of the change in aspect ratio between the first frame border and the second frame border.

16. The non-transitory computer readable storage device of claim 15, wherein the method further comprising:

capturing said images in a viewfinder of at least one of a digital still camera and a digital video recorder; and presenting said first frame border and said second frame border within said viewfinder.

17. The non-transitory computer readable storage device of claim 15, wherein the method further comprising:

determining a first smaller frame positioned within said first frame border, and a second smaller frame within said second frame border, wherein said detecting includes detecting a change between the first frame border and second frame border when a ratio of areas of the first smaller frame to first frame border and a ratio of areas of the second smaller frame to second frame border satisfies a predetermined criteria.

18. The non-transitory computer readable storage device according to claim 15, wherein the actuating includes automatically actuating the shutter and capturing the image solely in response to the detection of the change in aspect ratio between the first frame border and the second frame border.

* * * * *